US012768869B2

(12) United States Patent
Xie et al.

(10) Patent No.: US 12,768,869 B2
(45) Date of Patent: Oct. 20, 2026

(54) METHOD FOR PROCESSING ANISOTROPIC MAGNETIZED PLASMA MEDIUM AND SYSTEM THEREOF

(71) Applicant: Anhui University, Hefei City (CN)

(72) Inventors: Guoda Xie, Hefei City (CN); Guilin Hou, Hefei City (CN); Jiale Liu, Hefei City (CN); Wenjie Ding, Hefei City (CN); Jinpeng Dai, Hefei City (CN); Zhixiang Huang, Hefei City (CN)

(73) Assignee: Anhui University, Hefei City (CN)

( * ) Notice: Subject to any disclaimer, the term of this patent is extended or adjusted under 35 U.S.C. 154(b) by 384 days.

(21) Appl. No.: 18/501,739

(22) Filed: Nov. 3, 2023

(65) Prior Publication Data

US 2024/0353458 A1 Oct. 24, 2024

(30) Foreign Application Priority Data

Apr. 7, 2023 (CN) ......................... 202310365723.0

(51) Int. Cl.
*G01R 29/08* (2006.01)
*G06F 30/23* (2020.01)
*G06F 111/10* (2020.01)

(52) U.S. Cl.
CPC ......... *G01R 29/0807* (2013.01); *G06F 30/23* (2020.01); *G06F 2111/10* (2020.01)

(58) Field of Classification Search
CPC . G01R 29/0807; G06F 30/23; G06F 2111/10; G06F 17/11
See application file for complete search history.

(56) References Cited

U.S. PATENT DOCUMENTS 4,838,695 A * 6/1989 Mansuripur ........... G01N 21/21 356/369
6,933,812 B2 * 8/2005 Sarabandi .......... H01Q 15/0086 333/205
8,120,546 B2 * 2/2012 Smith .................... H01Q 15/08 343/909
8,765,231 B2 * 7/2014 Vuong .................... H01F 1/447 427/547
12,345,993 B2 * 7/2025 Didomenico ......... G02F 1/1676

(Continued)

*Primary Examiner* — Tung S Lau
(74) *Attorney, Agent, or Firm* — Birchwood IP

(57) ABSTRACT

A method for processing anisotropic magnetized plasma medium and a system thereof are provided. The method includes obtaining the Maxwell equation and the polarization current density equation based on the electromagnetic characteristics of anisotropic magnetized plasma; processing the Maxwell equation and the polarization current density equation to obtain the electric field intensity, the magnetic field intensity, and the polarization current density after processed; based on the electric field intensity, the magnetic field intensity, and the polarization current density after processed, numerical iterative equations for electric field intensity, magnetic field intensity, and polarization current density in anisotropic magnetized plasma medium are obtained; a numerical modeling simulation electromagnetic model is used to determine the electromagnetic characteristics of the electromagnetic model. The use of the present disclosure to simulate the propagation of electromagnetic waves in anisotropic magnetized plasma medium has higher numerical calculation accuracy.

1 Claim, 7 Drawing Sheets

(56) References Cited

U.S. PATENT DOCUMENTS

| | | | | |
|---|---|---|---|---|
| 2003/0232151 | A1 * | 12/2003 | Vukovic | H01J 37/32082<br>427/571 |
| 2005/0179394 | A1 * | 8/2005 | Rostoker | H05H 1/10<br>315/111.21 |
| 2010/0181915 | A1 * | 7/2010 | Rostoker | H05H 1/14<br>315/111.71 |

* cited by examiner (b)

(b)

METHOD FOR PROCESSING ANISOTROPIC MAGNETIZED PLASMA MEDIUM AND SYSTEM THEREOF

TECHNICAL FIELD

The present disclosure relates to the field of plasma medium processing, in particular to a method for processing anisotropic magnetized plasma medium and a system thereof.

BACKGROUND

Near space hypersonic vehicles have the advantages of both fast flight speed and moderate flight altitude, which brings great challenges to radar warning. At the same time, near space hypersonic vehicles can maneuver to avoid missile defense systems, which is very beneficial for military penetration and has significant military applications and research value. However, with the continuous faster of aircraft flight speed, the plasma sheath generated by hypersonic vehicle during near space flight can have an impact on the reception of measurement and control signals, and even cause communication interruption, resulting in a blackout and incalculable consequences. Therefore, the study of electromagnetic wave propagation mechanism in plasma is of great significance to overcome or even solve the problem of communication when ionization blackout occurs.

In the study of electromagnetic wave propagation in plasma, analytical calculations are difficult to obtain due to the complexity of the target model, and time-domain numerical methods play an important role. The advantage of the time-domain method lies in selecting a suitable broadband excitation source, and the electromagnetic response within the required frequency band can be obtained through a single simulation. Especially, the finite-difference time-domain method is highly concerned, with numerical characteristics of simple, intuitive, and easy to implement, it is widely used in electromagnetic wave propagation problems in plasma. However, the traditional FDTD (2,2) method only has second-order accuracy in time and space, and often requires the use of finer Yee grids to reduce numerical dispersion and anisotropy errors. In particular, plasma medium are often anisotropic, and their electromagnetic characteristics differ significantly in space. Therefore, it is necessary to use a finer grid than general medium simulations to discretize the electromagnetic model and reduce numerical errors. This will undoubtedly increase the memory usage of traditional FDTD (2,2) methods while reducing computational efficiency. In order to solve this problem, some high-order FDTD (2,4) methods with second-order numerical accuracy in time and fourth-order numerical accuracy in space have been proposed and used for dispersion medium simulation. The FDTD (2,4) method not only retains the explicit solving characteristics of the traditional FDTD (2,2) method, but also improves the numerical calculation accuracy of the time-domain method. However, the FDTD (2,4) method still cannot avoid long-term error accumulation, and its numerical stability needs to meet stricter CFL conditions. Subsequently, a symplectic finite-difference time-domain method (symplectic FDTD (4,4) and SFDTD (4,4)) with fourth-order numerical accuracy in both time and space is proposed. Unlike the ordinary FDTD (2,4) method, the symplectic algorithm is based on the fundamental principles of Hamiltonian mechanics and preserves the symplectic structure of the original system. It preserves the original symplectic structure of the discretized difference equation, and the symplectic algorithm has long-term stability and energy conservation characteristics. At present, the symplectic algorithm has been used to simulate electromagnetic propagation and electromagnetic scattering problems in anisotropic magnetized plasma. Although the previous work provided a Hamiltonian equation containing the current density term, there was no Taylor series expansion of the exponential matrix algorithm. The numerical discretization form of the SFDTD (4,4) method for current density field component is similar to that of the traditional FDTD (2,2) method. In numerical calculations, each iterative solution is simply divided into multi-level iterative solution. This symplectic discrete form only holds when the split matrix $U^{\alpha}=0$ (U is the split matrix, $\alpha \geq 2$). Generally speaking, when dealing with more complex dispersion model functions, the higher-order terms of the derived splitting matrix are not equal to zero, that is, $U^{\alpha} \neq 0$ ($\alpha \geq 2$).

SUMMARY

The objective of the present disclosure is to provide a method for processing anisotropic magnetized plasma medium and a system thereof, which can improve higher numerical calculation accuracy.

To achieve the above objective, the present disclosure provides the following solution:

A method for processing anisotropic magnetized plasma medium, including:

Obtaining a Maxwell equation and a polarization current density equation based on electromagnetic characteristics of anisotropic magnetized plasma;

Processing the Maxwell equation and the polarization current density equation to obtain an electric field intensity, a magnetic field intensity, and a polarization current density after processed;

Using a matrix exponential time-domain finite difference method to obtain numerical iterative equations for the electric field intensity, the magnetic field intensity, and the polarization current density in anisotropic magnetized plasma medium based on the electric field intensity, the magnetic field intensity, and the polarization current density after processed;

Applying a numerical modeling simulation electromagnetic model to determine electromagnetic characteristics of the electromagnetic model according to the numerical iterative equations for the electric field intensity, the magnetic field intensity, and the polarization current density in the anisotropic magnetized plasma medium.

Optionally, the Maxwell equation is:

$$\nabla \times E = -\mu_0 \frac{\partial H}{\partial t},$$

$$\nabla \times H = \varepsilon_0 \frac{\partial E}{\partial t} + J;$$

The polarization current density equation is:

$$\frac{dJ}{dt} + vJ = \varepsilon_0 \omega_p^2 E + {}_b \times;$$

Wherein, E is the electric field intensity, H is the magnetic field intensity, J is the polarization current density, $\varepsilon_0$, $\mu_0$ are respectively a dielectric constant and a permeability in vacuum, $\omega_p$ is a plasma frequency, v is a plasma collision frequency, $\omega_b=B_0/m_e$ is a electron cyclotron frequency, $B_0$ is an external static magnetic field, e is an electron charge, and $m_e$ is an electron mass.

Optionally, processing the Maxwell equation and the polarization current density equation to obtain the electric field intensity, the magnetic field intensity, and the polarization current density after processed, specifically including:

Performing multi-level symplectic discretization on the Maxwell equation and the polarization current density equation to obtain the electric field intensity, the magnetic field intensity, and the polarization current density in a symplectic discretization format:

$$E^{n+l/m}=E^{n+(l-1)/m}+\frac{d_l\Delta t}{\varepsilon_0}\nabla\times H^{n+l/m}+\frac{-d_l\Delta t}{\varepsilon_0}J^{n+l/m}$$

$$H^{n+l/m}=H^{n+(l-1)/m}+\frac{-c_l\Delta t}{\varepsilon_0}\nabla\times E^{n+l/m}$$

$$J^{n+l/m}=DJ^{n+(l-1)/m}+\varepsilon_0\omega_p^2FE^{n+(l-1)/m},$$

Wherein, $d_l$ and $c_l$ are coefficients of symplectic propagator, $$\Omega=\begin{bmatrix}-v & -\omega_{bz} & \omega_{by}\\ \omega_{bz} & -v & -\omega_{bx}\\ -\omega_{by} & \omega_{bx} & -v\end{bmatrix},$$

l is the order of a field component $\mathbf{W}=\mathbf{E}(\mathrm{J}, , )^T$, and m is the number of stages of non-dissipative p-order symplectic integral, $D=e^{CM}$, $F=\Omega^{-1}(D-I)$.

Optionally, using a matrix exponential time-domain finite difference method to obtain numerical iterative equations for the electric field intensity, the magnetic field intensity, and the polarization current density in anisotropic magnetized plasma medium based on the electric field intensity, the magnetic field intensity, and the polarization current density after processed specifically includes:

Assuming that the plasma medium is biased by a static magnetic field in the z-direction, based on the electric field intensity, the magnetic field intensity, and the polarization current density after processed, the matrix exponential time-domain finite difference method is used to obtain numerical iterative equations for the electric field intensity, the magnetic field intensity, and the polarization current density in anisotropic magnetized plasma medium:

$$E_x^{n+l/m}\left(i+\frac{1}{2},j,k\right)=E_x^{n+(l-1)/m}\left(i+\frac{1}{2},j,k\right)+\frac{d_l\Delta t}{\varepsilon_0}\times\Big\{\gamma_{y1}\Big[H_z^{n+l/m}\left(i+\frac{1}{2},j+\frac{1}{2},k\right)-H_z^{n+l/m}\left(i+\frac{1}{2},j-\frac{1}{2},k\right)\Big]+\gamma_{z1}\Big[-H_y^{n|l/m}\left(i+\frac{1}{2},j,k+\frac{1}{2}\right)+H_y^{n|l/m}\left(i+\frac{1}{2},j,k-\frac{1}{2}\right)\Big]+\gamma_{y2}\Big[H_z^{n+l/m}\left(i+\frac{1}{2},j+\frac{3}{2}A,k\right)-H_z^{n+l/m}\left(i+\frac{1}{2},j-\frac{3}{2},k\right)\Big]+\gamma_{z2}\Big[-H_y^{n+l/m}\left(i+\frac{1}{2},j,k+\frac{3}{2}\right)+H_y^{n+l/m}\left(i+\frac{1}{2},j,k-\frac{3}{2}\right)\Big]\Big\}-\frac{d_l\Delta t}{\varepsilon_0}J_x^{n+(l-1)/m}\left(i+\frac{1}{2},j,k\right)$$

-continued $$E_y^{n|l/m}\left(i,j+\frac{1}{2},k\right)=E_x^{n|(l\ 1)/m}\left(i,j+\frac{1}{2},k\right)+\frac{d_l\Delta t}{\varepsilon_0}\times\Big\{\gamma_{z1}\Big[H_x^{n+l/m}\left(i,j+\frac{1}{2},k+\frac{1}{2}\right)-H_x^{n-l/m}\left(i,j+\frac{1}{2},k-\frac{1}{2}\right)\Big]+\gamma_{x1}\Big[-H_z^{n|l/m}\left(i+\frac{1}{2},j+\frac{1}{2},k\right)+H_z^{n|l/m}\left(i-\frac{1}{2},j+\frac{1}{2},k\right)\Big]+\gamma_{z2}\Big[H_x^{n+l/m}\left(i,j+\frac{1}{2},k+\frac{3}{2}\right)-H_x^{n+l/m}\left(i,j+\frac{1}{2},k-\frac{3}{2}\right)\Big]+\gamma_{x2}\Big[-H_z^{n+l/m}\left(i+\frac{3}{2},j+\frac{1}{2},k\right)+H_z^{n+l/m}\left(i-\frac{3}{2},j+\frac{1}{2},k\right)\Big]\Big\}-\frac{d_l\Delta t}{\varepsilon_0}J_y^{n-(l-1)/m}\left(i,j+\frac{1}{2},k\right)$$

$$E_z^{n+l/m}\left(i,j,k+\frac{1}{2}\right)=E_z^{n+(l-1)/m}\left(i,j,k+\frac{1}{2}\right)+\frac{d_l\Delta t}{\varepsilon_0}\times\Big\{\gamma_{x1}\Big[H_y^{n+l/m}\left(i+\frac{1}{2},j,k+\frac{1}{2}\right)-H_y^{n+l/m}\left(i-+\frac{1}{2},j,k+\frac{1}{2}\right)\Big]+\gamma_{y1}\Big[H_x^{n+l/m}\left(i,j+\frac{1}{2},k+\frac{1}{2}\right)+H_x^{n+l/m}\left(i,j-\frac{1}{2},k+\frac{1}{2}\right)\Big]+\gamma_{x2}\Big[H_y^{n|l/m}\left(i+\frac{3}{2},j,k+\frac{1}{2}\right)-H_y^{n+l/m}\left(i-\frac{3}{2},j,k+\frac{1}{2}\right)\Big]\Big\}+\gamma_{y2}\Big[-H_x^{n+l/m}\left(i,j+\frac{3}{2},k+\frac{1}{2}\right)+H_x^{n+l/m}\left(i,j-\frac{3}{2},k+\frac{1}{2}\right)\Big]-\frac{d_l\Delta t}{\varepsilon_0}J_z^{n+(l-1)/m}\left(i,j,k+\frac{1}{2}\right)$$

$$H_x^{n+l/m}\left(i,j+\frac{1}{2},k+\frac{1}{2}\right)=H_x^{n|(l\ 1)/m}\left(i,j+\frac{1}{2},k+\frac{1}{2}\right)\Big]+\frac{c_l\Delta t}{\mu_0}\times\Big\{\gamma_{z1}\Big[E_y^{n+(l-1)/m}\left(i,j+\frac{1}{2},k+1\right)-E_y^{n+(l-1)/m}\left(i,j+\frac{1}{2},k\right)\Big]+\gamma_{y1}\Big[-E_z^{n-(l-1)/m}\left(i,j+1,k+\frac{1}{2}\right)+E_z^{n+(l-1)/m}\left(i,j,k+\frac{1}{2}\right)\Big]+\gamma_{z2}\Big[E_y^{n+(l-1)/m}\left(i,j+\frac{1}{2},k+2\right)-E_y^{n+(l-1)/m}\left(i,j+\frac{1}{2},k-1\right)\Big]+\gamma_{y2}\Big[-E_z^{n-(l-1)/m}\left(i,j+2,k+\frac{1}{2}\right)+E_z^{n+(l-1)/m}\left(i,j-1,k+\frac{1}{2}\right)\Big]\Big\}$$

$$H_y^{n-l/m}\left(i+\frac{1}{2},j,k+\frac{1}{2}\right)=H_y^{n-(l-1)/m}\left(i+\frac{1}{2},j,k+\frac{1}{2}\right)+\frac{c_l\Delta t}{\mu_0}\times\Big\{\gamma_{x1}\Big[E_z^{n+(l-1)/m}\left(i+1,j+\frac{1}{2},k\right)-E_z^{n+(l-1)/m}\left(i,j,k+\frac{1}{2}\right)\Big]+\gamma_{z1}\Big[-E_x^{n|(l\ 1)/m}\left(i+\frac{1}{2},j,k+1\right)+E_x^{n|(l\ 1)/m}\left(i+\frac{1}{2},j,k\right)\Big]+\gamma_{x2}\Big[E_z^{n+(l-1)/m}\left(i+2,j,k+\frac{1}{2}\right)-E_z^{n+(l-1)/m}\left(i-1,j,k+\frac{1}{2}\right)\Big]+\gamma_{z2}\Big[-E_x^{n+(l-1)/m}\left(i+\frac{1}{2},j,k+2\right)+E_x^{n+(l-1)/m}\left(i+\frac{1}{2},j,k-1\right)\Big]\Big\}$$

$$H_z^{n-l/m}\left(i+\frac{1}{2},j+\frac{1}{2},k\right)=H_z^{n-(l-1)/m}\left(i+\frac{1}{2},j+\frac{1}{2},k\right)+\frac{c_l\Delta t}{\mu_0}\times\Big\{\gamma_{y1}\Big[E_x^{n+(l-1)/m}\left(i+\frac{1}{2},j+1,k\right)-E_x^{n+(l-1)/m}\left(i+\frac{1}{2},j,k\right)\Big]+\gamma_{x1}\Big[-E_y^{n|(l\ 1)/m}\left(i+1,j+\frac{1}{2},k\right)+E_y^{n\ (l\ 1)/m}\left(i,j+\frac{1}{2},k\right)\Big]+\gamma_{y2}\Big[E_x^{n+(l-1)/m}\left(i+\frac{1}{2},j+2,k\right)-E_x^{n+(l-1)/m}\left(i+\frac{1}{2},j-1,k\right)\Big]+\gamma_{x2}\Big[-E_y^{n+(l-1)/m}\left(i+2,j+\frac{1}{2},k\right)+E_y^{n+(l-1)/m}\left(i-1,j+\frac{1}{2},k\right)\Big]\Big\}$$

$$J_x^{n+\frac{l}{m}}\left(i+\frac{1}{2},j,k\right)=\left[\cos(\omega_bc_ldt)e^{-vc_ldt}\right]J_x^{n+\frac{l-1}{m}}\left(i+\frac{1}{2},j,k\right)+\left[\sin(\omega_bc_ldt)e^{-vc_ldt}\right]J_y^{n+\frac{l-1}{m}}\left(i+\frac{1}{2},j,k\right)+$$

-continued $$\varepsilon_0\omega_p^2\left\{\frac{v\left[1-\cos(\omega_b c_l dt)e^{-vc_l dt}\right]}{v^2+\omega_p^2}+\frac{\omega_b\sin(\omega_b c_l dt)e^{-vc_l dt}}{v^2+\omega_p^2}\right\}$$

$$E_y^{n+\frac{l-1}{m}}\left(i+\frac{1}{2},j,k\right)+$$

$$\varepsilon_0\omega_p^2\left\{\frac{v\sin(\omega_b c_l dt)e^{-vc_l dt}]}{v^2+\omega_p^2}+\frac{\omega_b\left[\cos(\omega_b c_l dt)e^{-vc_l dt}-1\right]}{v^2+\omega_p^2}\right\}E_y^{n+\frac{l-1}{m}}\left(i+\frac{1}{2},j,k\right)$$

Because a current density position is the same as an electric field position, therefore, when calculating $$J_\lambda^{n+l/m}\left(i+\frac{1}{2},j,k\right),$$

it is necessary to perform interpolation on $$J_y^{n-l/m}\left(i+\frac{1}{2},j,k\right)\text{ and }E_y^{n-l/m}\left(i+\frac{1}{2},j,k\right),$$

because $J_y$ and $E_y$ are no value at a point $$\left(i+\frac{1}{2},j,k\right),$$

so it needs to be averaged by four adjacent diagonal values to obtain:

$$J_y^{n-l/m}\left(i+\frac{1}{2},j,k\right)=\frac{1}{4}\left(J_y^{n-l/m}\left(i,j-\frac{1}{2},k\right)+J_y^{n-l/m}\left(i,j+\frac{1}{2},k\right)+J_y^{n-l/m}\left(i+1,j+\frac{1}{2},k\right)+J_y^{n-l/m}\left(i+1,j-\frac{1}{2},k\right)\right)$$

$$E_y^{n-l/m}\left(i+\frac{1}{2},j,k\right)=\frac{1}{4}\left(E_Y^{n-l/m}\left(i,j-\frac{1}{2},k\right)+E_y^{n-l/m}\left(i,j+\frac{1}{2},k\right)+E_y^{n-l/m}\left(i+1,j+\frac{1}{2},k\right)+E_y^{n-l/m}\left(i+1,j-\frac{1}{2},k\right)\right)$$

$$J_y^{n+\frac{l}{m}}\left(i,j+\frac{1}{2},k\right)=\left[\cos(\omega_b c_l dt)e^{-vc_l dt}\right]J_y^{n+\frac{l-1}{m}}\left(i,j+\frac{1}{2},k\right)+\left[\sin(\omega_b c_l dt)e^{-vc_l dt}\right]J_x^{n+\frac{l-1}{m}}\left(i+\frac{1}{2},j,k\right)+$$

$$\varepsilon_0\omega_p^2\left\{\frac{v\left[1-\cos(\omega_b c_l dt)e^{-vc_l dt}\right]}{v^2+\omega_b^2}+\frac{\omega_b\sin(\omega_b c_l dt)e^{-vc_l dt}}{v^2+\omega_b^2}\right\}E_y^{n+\frac{l-1}{m}}\left(i,j+\frac{1}{2},k\right)-$$

$$\varepsilon_0\omega_p^2\left\{\frac{v\sin(\omega_b c_l dt)e^{-vc_l dt}}{v^2+\omega_b^2}+\frac{\omega_b\left[\cos(\omega_b c_l dt)e^{-vc_l dt}-1\right]}{v^2+\omega_b^2}\right\}E_x^{n+\frac{l-1}{m}}\left(i,j+\frac{1}{2},k\right)$$

Because the current density position is the same as the electric field position, therefore, when calculating $$J_y^{n+l/m}\left(i,j+\frac{1}{2},k\right),$$

it is necessary to perform interpolation on $$J_x^{n-l/m}\left(i,j+\frac{1}{2},k\right)\text{ and }E_x^{n+l/m}\left(i,j+\frac{1}{2},k\right),$$

because $J_x$ and $E_x$ are no value at a point $$\left(i,j+\frac{1}{2},k\right),$$

so it needs to be averaged by four adjacent diagonal values to obtain:

$$J_x^{n-l/m}\left(i,j+\frac{1}{2},k\right)=\frac{1}{4}\left(J_x^{n-l/m}\left(i-\frac{1}{2},j,k\right)+J_x^{n-l/m}\left(i+\frac{1}{2},j,k\right)+J_x^{n-l/m}\left(i+\frac{1}{2},j+1,k\right)+J_x^{n-l/m}\left(i-\frac{1}{2},j+1,k\right)\right)$$

$$E_x^{n+l/m}\left(i,j+\frac{1}{2},k\right)=\frac{1}{4}\left(E_x^{n-l/m}\left(i-\frac{1}{2},j,k\right)+E_x^{n-l/m}\left(i+\frac{1}{2},j,k\right)+E_x^{n-l/m}\left(i+\frac{1}{2},j+1,k\right)+E_x^{n-l/m}\left(i-\frac{1}{2},j+1,k\right)\right)$$

$$J_z^{n+\frac{l}{m}}\left(i,j,k+\frac{1}{2}\right)=e^{vc_l dt}J_z^{n+\frac{l-1}{m}}\left(i,j,k+\frac{1}{2}\right)-\frac{e^{-vc_l dt}-1}{v}E_z^{n+\frac{l-1}{m}}\left(i,j,k+\frac{1}{2}\right)$$

Wherein, i, j, k represent spatial nodes of electrical field, magnetic field, and current density:

$$\gamma_{x1}=\frac{9}{8}\frac{1}{\Delta x},\ \gamma_{y1}=\frac{9}{8}\frac{1}{\Delta y},\ \gamma_{z1}=\frac{9}{8}\frac{1}{\Delta z},$$

$$\gamma_{x2}=\frac{-1}{24}\frac{1}{\Delta x},\ \gamma_{y2}=\frac{-1}{24}\frac{1}{\Delta y},\ \gamma_{z2}=\frac{-1}{24}\frac{1}{\Delta z}.$$

Optionally, the electromagnetic model comprises an anisotropic magnetized plasma slab model, a blunt cone model, and a sphere model.

A system for processing anisotropic magnetized plasma medium, including:

A Maxwell equation and polarization current density equation determination module, configured to obtain a Maxwell equation and a polarization current density equation based on electromagnetic characteristics of anisotropic magnetized plasma;

A Maxwell equation and polarization current density equation processing module, configured to process the Maxwell equation and the polarization current density equation to obtain the electric field intensity, the magnetic field intensity, and the polarization current density after processed;

A matrix exponential time-domain finite difference processing module, configured to obtain numerical iterative equations for electric field intensity, magnetic field intensity, and polarization current density in anisotropic magnetized plasma medium using the matrix exponential time-domain finite difference method based on the electric field intensity, the magnetic field intensity, and the polarization current density after processed;

An electromagnetic characteristic determination module, configured to determine electromagnetic characteristics of the electromagnetic model using a numerical modeling simulation electromagnetic model based on the numerical iterative equations of the electric field intensity, the magnetic field intensity, and the polarization current density in the anisotropic magnetized plasma medium.

Optionally, the Maxwell equation is:

$$\nabla \times E = -\mu_0 \frac{\partial H}{\partial t};$$

$$\nabla \times H = \varepsilon_0 \frac{\partial E}{\partial t} + J;$$

The polarization current density equation is:

$$\frac{dJ}{dt} + vJ = \varepsilon_0 \omega_p^2 E + \omega_b \times J;$$

Wherein, E is a electric field intensity, H is a magnetic field intensity, J is a polarization current density, $\varepsilon_0$ and $\mu_0$ are respectively a dielectric constant and a permeability in vacuum, $\omega_p$ is a plasma frequency, v is a plasma collision frequency, $\omega_b = B_0/m_e$ is an electron cyclotron frequency, $B_0$ is an external static magnetic field, e is an electron charge, and $m_e$ is an electron mass.

Optionally, the Maxwell equation and polarization current density equation processing module includes:

A Maxwell equation and polarization current density equation processing unit, configured to perform multi-level symplectic discretization on the Maxwell equation and the polarization current density equation to obtain the electric field intensity, the magnetic field intensity, and the polarization current density in the symplectic discretization format:

$$\begin{aligned} E^{n+l/m} &= E^{n+(l-1)/m} + \frac{d_l \Delta t}{\varepsilon_0} \nabla \times H^{n+l/m} + \frac{-d_l \Delta t}{\varepsilon_0} J^{n+l/m} \\ H^{n+l/m} &= H^{n+(l-1)/m} + \frac{-c_l \Delta t}{\mu_0} \nabla \times E^{n+(l-1)/m} \\ J^{n+l/m} &= DJ^{n+(l-1)/m} + \varepsilon_0 \omega_p^2 F E^{n+(l-1)/m} \end{aligned},$$

Wherein, $d_l$ and $c_l$ are coefficients of the symplectic propagator, $$\Omega = \begin{bmatrix} -v & -\omega_{bz} & \omega_{by} \\ \omega_{bz} & -v & -\omega_{bx} \\ -\omega_{by} & \omega_{bx} & -v \end{bmatrix},$$

l is the order of a field component $W = (E, J, , )^T$, and m is the number of stages of non-dissipative p-order symplectic integral, $D = e^{CM}$, $F = \Omega^{-1}(D - I)$.

Optionally, the matrix exponential time-domain finite difference processing module includes:

A Matrix exponential time-domain finite difference processing unit, assuming that the plasma medium is biased by a static magnetic field in the z-direction, based on the electric field intensity, the magnetic field intensity, and the polarization current density after processed, the matrix exponential time-domain finite difference method is used to obtain numerical iterative equations for the electric field intensity, the magnetic field intensity, and the polarization current density in anisotropic magnetized plasma medium:

$$\begin{aligned} E_x^{n+l/m}\left(i+\frac{1}{2}, j, k\right) = {} & E_x^{n+(l-1)/m}\left(i+\frac{1}{2}, j, k\right) + \\ & \frac{d_l \Delta t}{\varepsilon_0} \times \left\{ \gamma_{y1}\left[H_z^{n+l/m}\left(i+\frac{1}{2}, j+\frac{1}{2}, k\right) - H_z^{n+l/m}\left(i+\frac{1}{2}, j-\frac{1}{2}, k\right)\right] + \right. \\ & \gamma_{z1}\left[-H_y^{n+l/m}\left(i+\frac{1}{2}, j, k+\frac{1}{2}\right) + H_y^{n+l/m}\left(i+\frac{1}{2}, j, k-\frac{1}{2}\right)\right] + \\ & \gamma_{y2}\left[H_2^{n+l/m}\left(i+\frac{1}{2}, j+\frac{3}{2}, k\right) - H_z^{n+l/m}\left(i+\frac{1}{2}, j-\frac{3}{2}, k\right)\right] + \\ & \left. \gamma_{z2}\left[-H_y^{n|l/m}\left(i+\frac{1}{2}, j, k+\frac{3}{2}\right) + H_y^{n|l/m}\left(i+\frac{1}{2}, j, k-\frac{3}{2}\right)\right] \right\} - \\ & \frac{d_l \Delta t}{\varepsilon_0} J_x^{n+(l-1)/m}\left(i+\frac{1}{2}, j, k\right) \end{aligned}$$

$$\begin{aligned} E_y^{n|l/m}\left(i, j+\frac{1}{2}, k\right) = {} & E_x^{n|(l\ 1)/m}\left(i, j+\frac{1}{2}, k\right) + \\ & \frac{d_l \Delta t}{\varepsilon_0} \times \left\{ \gamma_{z1}\left[H_x^{n+l/m}\left(i, j+\frac{1}{2}, k+\frac{1}{2}\right) - H_x^{n-1/m}\left(i, j+\frac{1}{2}, k-\frac{1}{2}\right)\right] + \right. \\ & \gamma_{x1}\left[-H_z^{n|l/m}\left(i+\frac{1}{2}, j+\frac{1}{2}, k\right) + H_z^{n|l/m}\left(i-\frac{1}{2}, j+\frac{1}{2}, k\right)\right] + \\ & \gamma_{z2}\left[H_x^{n+l/m}\left(i, j+\frac{1}{2}, k+\frac{3}{2}\right) - H_x^{n+l/m}\left(i, j+\frac{1}{2}, k-\frac{3}{2}\right)\right] + \\ & \left. \gamma_{x2}\left[-H_z^{n+l/m}\left(i+\frac{3}{2}, j+\frac{1}{2}, k\right) + H_z^{n+l/m}\left(i-\frac{3}{2}, j+\frac{1}{2}, k\right)\right] \right\} - \\ & \frac{d_l \Delta t}{\varepsilon_0} J_y^{n-(l-1)/m}\left(i, j+\frac{1}{2}, k\right) \end{aligned}$$

$$\begin{aligned} E_z^{n+l/m}\left(i, j, k+\frac{1}{2}\right) = {} & E_z^{n+(l-1)/m}\left(i, j, k+\frac{1}{2}\right) + \\ & \frac{d_l \Delta t}{\varepsilon_0} \times \left\{ \gamma_{x1}\left[H_y^{n+l/m}\left(i+\frac{1}{2}, j, k+\frac{1}{2}\right) - H_y^{n+l/m}\left(i-\frac{1}{2}, j, k+\frac{1}{2}\right)\right] + \right. \\ & \gamma_{y1}\left[-H_x^{n+l/m}\left(i, j+\frac{1}{2}, k+\frac{1}{2}\right) + H_x^{n+l/m}\left(i, j-\frac{1}{2}, k+\frac{1}{2}\right)\right] + \\ & \gamma_{x2}\left[H_y^{n+l/m}\left(i+\frac{3}{2}, j, k+\frac{1}{2}\right) - H_y^{n+l/m}\left(i-\frac{3}{2}, j, k+\frac{1}{2}\right)\right] + \\ & \left. \gamma_{y2}\left[-H_x^{n+l/m}\left(i, j+\frac{3}{2}, k+\frac{1}{2}\right) + H_x^{n+l/m}\left(i, j-\frac{3}{2}, k+\frac{1}{2}\right)\right] \right\} - \\ & \frac{d_l \Delta t}{\varepsilon_0} J_z^{n+(l-1)/m}\left(i, j, k+\frac{1}{2}\right) \end{aligned}$$

$$\begin{aligned} H_x^{n|l/m}\left(i, j+\frac{1}{2}, k+\frac{1}{2}\right) = {} & H_x^{n|(l\ 1)/m}\left(i, j+\frac{1}{2}, k+\frac{1}{2}\right) + \\ & \frac{c_l \Delta t}{\mu_0} \times \left\{ \gamma_{z1}\left[E_y^{n+(l-1)/m}\left(i, j+\frac{1}{2}, k+1\right) - E_y^{n+(l-1)/m}\left(i, j+\frac{1}{2}, k\right)\right] + \right. \\ & \gamma_{y1}\left[-E_z^{n-(l-1)/m}\left(i, j+1, k+\frac{1}{2}\right) + E_z^{n+(l-1)/m}\left(i, j, k+\frac{1}{2}\right)\right] + \\ & \gamma_{z2}\left[E_y^{n+(l-1)/m}\left(i, j+\frac{1}{2}, k+2\right) - E_y^{n+(l-1)/m}\left(i, j+\frac{1}{2}, k-1\right)\right] + \\ & \left. \gamma_{y2}\left[-E_z^{n-(l-1)/m}\left(i, j+2, k+\frac{1}{2}\right) + E_z^{n+(l-1)/m}\left(i, j-1, k+\frac{1}{2}\right)\right] \right\} \end{aligned}$$

$$\begin{aligned} H_y^{n-l/m}\left(i+\frac{1}{2}, j, k+\frac{1}{2}\right) = {} & H_y^{n-(l-1)/m}\left(i+\frac{1}{2}, j, k+\frac{1}{2}\right) + \\ & \frac{c_l \Delta t}{\mu_0} \times \left\{ \gamma_{x1}\left[E_z^{n+(l-1)/m}\left(i+1, j+\frac{1}{2}, k\right) - E_z^{n+(l-1)/m}\left(i, j, k+\frac{1}{2}\right)\right] + \right. \\ & \gamma_{z1}\left[-E_x^{n|(l\ 1)/m}\left(i+\frac{1}{2}, j, k+1\right) + E_x^{n|(l\ 1)/m}\left(i+\frac{1}{2}, j, k\right)\right] + \\ & \gamma_{x2}\left[E_z^{n+(l-1)/m}\left(i+2, j, k+\frac{1}{2}\right) - E_z^{n+(l-1)/m}\left(i-1, j, k+\frac{1}{2}\right)\right] + \\ & \left. \gamma_{z2}\left[-E_x^{n+(l-1)/m}\left(i+\frac{1}{2}, j, k+2\right) + E_x^{n+(l-1)/m}\left(i+\frac{1}{2}, j, k-1\right)\right] \right\} \end{aligned}$$

$$H_z^{n-l/m}\left(i+\frac{1}{2}, j+\frac{1}{2}, k\right) = H_z^{n-(l-1)/m}\left(i+\frac{1}{2}, j+\frac{1}{2}, k\right) +$$

-continued $$\frac{c_l\Delta t}{\mu_0}\times\left\{\gamma_{y1}\left[E_x^{n+(l-1)/m}\left(i+\frac{1}{2},j+1,k\right)-E_x^{n+(l-1)/m}\left(i+\frac{1}{2},j,k\right)\right]+\gamma_{x1}\left[-E_y^{n+(l-1)/m}\left(i+1,j+\frac{1}{2},k\right)+E_y^{n+(l-1)/m}\left(i,j+\frac{1}{2},k\right)\right]+\gamma_{y2}\left[E_x^{n+(l-1)/m}\left(i+\frac{1}{2},j+2,k\right)-E_x^{n+(l-1)/m}\left(i+\frac{1}{2},j-1,k\right)\right]+\gamma_{x2}\left[-E_y^{n+(l-1)/m}\left(i+2,j+\frac{1}{2},k\right)+E_y^{n+(l-1)/m}\left(i-1,j+\frac{1}{2},k\right)\right]\right\}$$

$$J_x^{n+\frac{l}{m}}\left(i+\frac{1}{2},j,k\right)=\left[\cos(\omega_b c_l dt)e^{-vc_l dt}\right]J_x^{n+\frac{l-1}{m}}\left(i+\frac{1}{2},j,k\right)+\left[\sin(\omega_b c_l dt)e^{-vc_l dt}\right]J_y^{n+\frac{l-1}{m}}\left(i+\frac{1}{2},j,k\right)+\varepsilon_0\omega_p^2\left\{\frac{v\left[1-\cos(\omega_b c_l dt)e^{-vc_l dt}\right]}{v^2+\omega_b^2}+\frac{\omega_b\sin(\omega_b c_l dt)e^{-vc_l dt}}{v^2+\omega_b^2}\right\}E_x^{n+\frac{l-1}{m}}\left(i+\frac{1}{2},j,k\right)+\varepsilon_0\omega_p^2\left\{\frac{v\sin(\omega_b c_l dt)e^{-vc_l dt}}{v^2+\omega_b^2}+\frac{\omega_b\left[\cos(\omega_b c_l dt)e^{-vc_l dt}-1\right]}{v^2+\omega_b^2}\right\}E_y^{n+\frac{l-1}{m}}\left(i+\frac{1}{2},j,k\right)$$

Because a current density position is the same as an electric field position, therefore, when calculating $$J_x^{n+l/m}\left(i+\frac{1}{2},j,k\right),$$

it is necessary to perform interpolation because J, and E, are no value at a point on $$J_y^{n-l/m}\left(i+\frac{1}{2},j,k\right)\text{ and }E_y^{n-l/m}\left(i+\frac{1}{2},j,k\right),$$

because $J_y$ and $E_y$ are no value at point $$\left(i+\frac{1}{2},j,k\right),$$

so it needs to be averaged by four adjacent diagonal values to obtain:

$$J_y^{n-l/m}\left(i+\frac{1}{2},j,k\right)=\frac{1}{4}\left(J_y^{n-l/m}\left(i,j-\frac{1}{2},k\right)+J_y^{n-l/m}\left(i,j+\frac{1}{2},k\right)+J_y^{n-l/m}\left(i+1,j+\frac{1}{2},k\right)+J_y^{n-l/m}\left(i+1,j-\frac{1}{2},k\right)\right)$$

$$E_y^{n-l/m}\left(i+\frac{1}{2},j,k\right)=\frac{1}{4}\left(E_y^{n-l/m}\left(i,j-\frac{1}{2},k\right)+E_y^{n-l/m}\left(i,j+\frac{1}{2},k\right)+E_y^{n-l/m}\left(i+1,j+\frac{1}{2},k\right)+E_y^{n-l/m}\left(i+1,j-\frac{1}{2},k\right)\right)$$

$$J_y^{n+\frac{l}{m}}\left(i,j+\frac{1}{2},k\right)=\left[\cos(\omega_b c_l dt)e^{-vc_l dt}\right]J_y^{n+\frac{l-1}{m}}\left(i,j+\frac{1}{2},k\right)+\left[\sin(\omega_b c_l dt)e^{-vc_l dt}\right]J_x^{n+\frac{l-1}{m}}\left(i+\frac{1}{2},j,k\right)+\varepsilon_0\omega_p^2\left\{\frac{v\left[1-\cos(\omega_b c_l dt)e^{-vc_l dt}\right]}{v^2+\omega_b^2}+\frac{\omega_b\sin(\omega_b c_l dt)e^{-vc_l dt}}{v^2+\omega_b^2}\right\}E_y^{n+\frac{l-1}{m}}\left(i,j+\frac{1}{2},k\right)-\varepsilon_0\omega_p^2\left\{\frac{v\sin(\omega_b c_l dt)e^{-vc_l dt}}{v^2+\omega_b^2}+\frac{\omega_b\left[\cos(\omega_b c_l dt)e^{-vc_l dt}-1\right]}{v^2+\omega_b^2}\right\}E_x^{n+\frac{l-1}{m}}\left(i,j+\frac{1}{2},k\right)$$

Because the current density position is the same as the electric field position, therefore, when calculating $$J_y^{n+l/m}\left(i,j+\frac{1}{2},k\right),$$

it is necessary to perform interpolation on $$J_x^{n-l/m}\left(i,j+\frac{1}{2},k\right)\text{ and }E_x^{n+l/m}\left(i,j+\frac{1}{2},k\right),$$

because $J_x$ and $E_x$ are no value at a point $$\left(i,j+\frac{1}{2},k\right),$$

so it needs to be averaged by four adjacent diagonal values to obtain:

$$J_x^{n-l/m}\left(i,j+\frac{1}{2},k\right)=\frac{1}{4}\left(J_x^{n-1/m}\left(i-\frac{1}{2},j,k\right)+J_x^{n-l/m}\left(i+\frac{1}{2},j,k\right)+J_x^{n-l/m}\left(i+\frac{1}{2},j+1,k\right)+J_x^{n-l/m}\left(i-\frac{1}{2},j+1,k\right)\right)$$

$$E_x^{n+l/m}\left(i,j+\frac{1}{2},k\right)=\frac{1}{4}\left(E_K^{n-l/m}\left(i-\frac{1}{2},j,k\right)+E_x^{n-l/m}\left(i+\frac{1}{2},j,k\right)+E_x^{n-l/m}\left(i+\frac{1}{2},j+1,k\right)+E_x^{n-l/m}\left(i-\frac{1}{2},j+1,k\right)\right)$$

$$J_z^{n+\frac{l}{m}}\left(i,j,k+\frac{1}{2}\right)=e^{-vc_l dt}J_z^{n+\frac{l-1}{m}}\left(i,j,k+\frac{1}{2}\right)-\frac{e^{-vc_l dt}-1}{v}E_z^{n+\frac{l-1}{m}}\left(i,j,k+\frac{1}{2}\right)$$

Wherein, i, j, k represents spatial nodes of electrical field, magnetic field, and current density:

$$\gamma_{x1}=\frac{9}{8}\frac{1}{\Delta x},\ \gamma_{y1}=\frac{9}{8}\frac{1}{\Delta y},\ \gamma_{z1}=\frac{9}{8}\frac{1}{\Delta z},$$

$$\gamma_{x2}=\frac{-1}{24}\frac{1}{\Delta x},\ \gamma_{x2}=\frac{-1}{24}\frac{1}{\Delta y},\ \gamma_{z2}=\frac{-1}{24}\frac{1}{\Delta z}.$$

Optionally, the electromagnetic model includes an anisotropic magnetized plasma slab model, a blunt cone model, and a sphere model.

According to the specific embodiments provided by the present disclosure, the following technical effects are disclosed:

The present disclosure provides a method for processing anisotropic magnetized plasma medium, which obtains Maxwell equation and polarization current density equation based on the electromagnetic characteristics of each anisotropic magnetized plasma; process the Maxwell equation and the polarization current density equation to obtain the electric field intensity, the magnetic field intensity, and the polarization current density after processed; based on the electric field intensity, the magnetic field intensity, and the polarization current density after processed, numerical iterative equations for electric field intensity, magnetic field intensity, and polarization current density in anisotropic magnetized plasma medium are obtained using the matrix exponential time-domain finite difference method; according to the numerical iterative equations for the electric field intensity, the magnetic field intensity, and polarization current density in anisotropic magnetized plasma medium, a numerical modeling simulation electromagnetic model is used to determine the electromagnetic characteristics of the electromagnetic model. The use of the present disclosure ME-FDTD (4,4) to simulate the propagation of electromagnetic waves in anisotropic magnetized plasma medium has higher numerical calculation accuracy.

BRIEF DESCRIPTION OF THE DRAWINGS

In order to provide a clearer illustration of the embodiments of the present disclosure or the technical solutions in the prior art, a brief introduction will be given to the accompanying drawings required in the embodiments. It is evident that the accompanying drawings in the following description are only some embodiments of the present disclosure. For ordinary skilled person in the art, other accompanying drawings can also be obtained based on these drawings without any creative effort.

DETAILED DESCRIPTION OF THE EMBODIMENTS

The following will provide a clear and complete description of the technical solution in the embodiments of the present disclosure, in conjunction with the accompanying drawings. Obviously, the described embodiments are only a part of the embodiments of the present disclosure, not all of them. Based on the embodiments in the present disclosure, all other embodiments obtained by ordinary skilled person in the art without creative labor fall within the scope of the present disclosure.

The objective of the present disclosure is to provide a method for processing anisotropic magnetized plasma medium and a system thereof, which can improve higher numerical calculation accuracy.

In order to make the above objectives, features, and advantages of the present disclosure more apparent and understandable, the following will provide further detailed explanations of the present disclosure in conjunction with the accompanying drawings and specific implementation methods.

Figure 1:
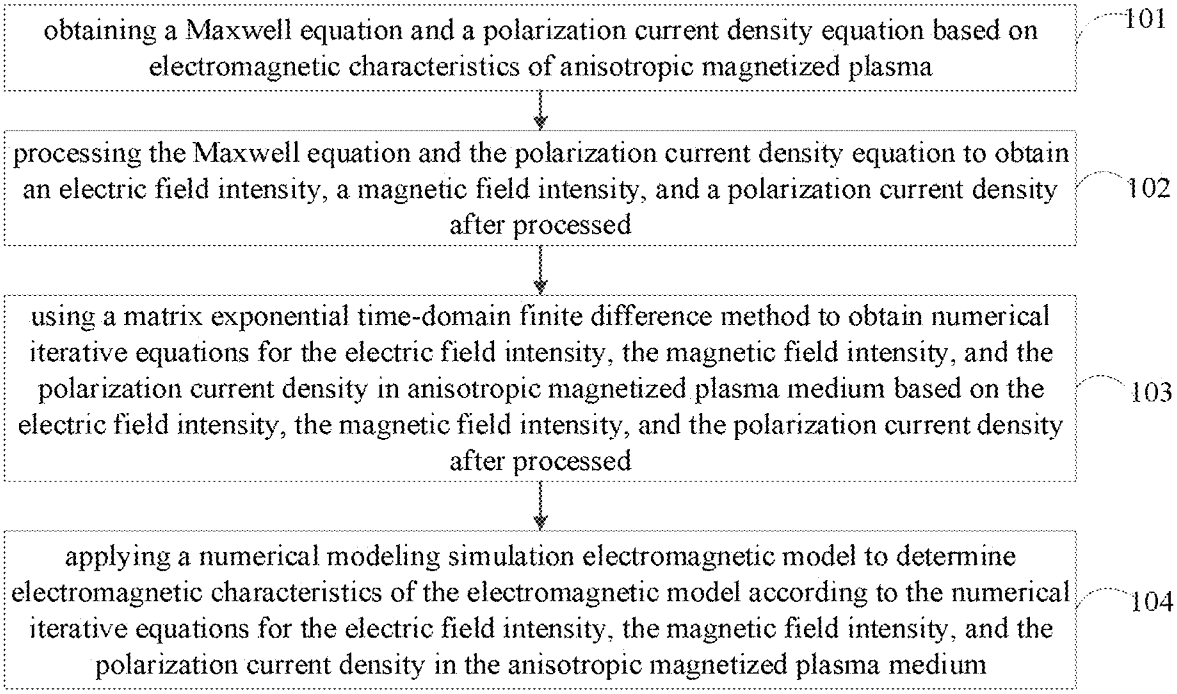
FIG. 1 is a flowchart of a method for processing anisotropic magnetized plasma medium of the present disclosure.

FIG. 1 is a flowchart of anisotropic magnetized plasma medium processing methods of the present disclosure. As shown in FIG. 1, a method for processing anisotropic magnetized plasma medium includes:

Step 101: obtaining a Maxwell equation and a polarization current density equation based on electromagnetic characteristics of anisotropic magnetized plasma;

The Maxwell equation is:

$$\nabla \times E = -\mu_0 \frac{\partial H}{\partial t} \tag{1}$$

$$\nabla \times H = \varepsilon_0 \frac{\partial E}{\partial t} + J \tag{2}$$

The polarization current density equation is:

$$\frac{dJ}{dt} + vJ = \varepsilon_0 \omega_p^2 E +_b \times \tag{3}$$

wherein, E is the electric field intensity, H is the magnetic field intensity, J is the polarization current density, $\varepsilon_0$, $\mu_0$ are respectively a dielectric constant and a permeability in vacuum, $\omega_p$ is a plasma frequency, v is a plasma collision frequency, $\omega_b = B_0/m_e$ is a electron cyclotron frequency, $B_0$ is an external static magnetic field, e is an electron charge, and $m_e$ is an electron mass.

The equation can be expressed in the following form $$\frac{dJ}{dt} = \varepsilon_0 \omega_p^2 E + \Omega J \tag{4}$$

Wherein $$\Omega = \begin{bmatrix} -v & -\omega_{bz} & \omega_{by} \\ \omega_{bz} & -v & -\omega_{bx} \\ -\omega_{by} & \omega_{bx} & -v \end{bmatrix} \tag{5}$$

Then, write equations (1), (2), and (3) in matrix form:

$$\frac{\partial}{\partial t}\begin{bmatrix} H \\ E \\ J \end{bmatrix} = \begin{bmatrix} 0 & -\frac{\nabla \times}{\mu_0} & 0 \\ \frac{\nabla \times}{\varepsilon_0} & 0 & -\frac{1}{\varepsilon_0} \\ 0 & \varepsilon_0 \omega_p^2 & \Omega \end{bmatrix}\begin{bmatrix} H \\ E \\ J \end{bmatrix} \tag{6}$$

Let $\boldsymbol{W} = E(J, , )^T$, the equation can be expressed as:

$$\frac{\partial\Psi}{\partial t} = A\Psi \tag{7}$$

Wherein $$A = \begin{bmatrix} 0 & -\frac{\nabla\times}{\mu_0} & 0 \\ \frac{\nabla\times}{\varepsilon_0} & 0 & -\frac{1}{\varepsilon_0} \\ 0 & \varepsilon_0\omega_p^2 & \Omega \end{bmatrix}, \nabla\times = \begin{bmatrix} 0 & -\frac{\partial}{\partial z} & \frac{\partial}{\partial y} \\ \frac{\partial}{\partial z} & 0 & -\frac{\partial}{\partial x} \\ -\frac{\partial}{\partial y} & \frac{\partial}{\partial x} & 0 \end{bmatrix} \tag{8}$$

Step 102: processing the Maxwell equation and the polarization current density equation to obtain an electric field intensity, a magnetic field intensity, and a polarization current density after processed.

performing multi-level symplectic discretization on the Maxwell equation and the polarization current density equation to obtain the electric field intensity, the magnetic field intensity, and the polarization current density in a symplectic discretization format:

$$E^{n+l/m} = E^{n+(l-1)/m} + \frac{d_l\Delta t}{\varepsilon_0}\nabla\times H^{n+l/m} + \frac{-d_l\Delta t}{\varepsilon_0}J^{n+l/m}$$

$$H^{n+l/m} = H^{n+(l-1)/m} + \frac{-c_l\Delta t}{\mu_0}\nabla\times E^{n+(l-1)/m}$$

$$J^{n+l/m} = DJ^{n+(l-1)/m} + \varepsilon_0\omega_p^2 FE^{n+(l-1)/m},$$

wherein, $d_l$ and $c_l$ are coefficients of symplectic propagator, $$\Omega = \begin{bmatrix} -v & -\omega_{bz} & \omega_{by} \\ \omega_{bz} & -v & -\omega_{bx} \\ -\omega_{by} & \omega_{bx} & -v \end{bmatrix},$$

l is the order of a field component $\Psi = (J, , )^T$, and m is the number of stages of non-dissipative p-order symplectic integral, $D=e^{CM}$, $F=\Omega^{-1}(D-I)$.

According to the theory of symplectic propagation operators, the field at the time $t=\Delta t$ can be represented by an exponential operator $\exp(A\Delta t)$ as $$\Psi(\Delta t) = e^{A\Delta t}\psi(0) \tag{9}$$

Let $$A = U + V \tag{10}$$

Wherein $$U = \begin{bmatrix} 0 & -\frac{\nabla\times}{\mu_0} & 0 \\ 0 & 0 & 0 \\ 0 & \varepsilon_0\omega_p^2 & \Omega \end{bmatrix}, V = \begin{bmatrix} 0 & 0 & 0 \\ \frac{\nabla\times}{\varepsilon_0} & 0 & -\frac{1}{\varepsilon_0} \\ 0 & 0 & 0 \end{bmatrix} \tag{11}$$

Using a non-dissipative m-stage and p-order exponential integral method to approximate the time evolution matrix $\exp(A\Delta t)$, $$e^{A\Delta t} = e^{(U+V)\Delta t} = \prod_{l=1}^{m} e^{d_l\Delta t V}e^{c_l\Delta t U} + O(\Delta_t^{p+1}) \tag{12}$$

Wherein, $d_l$ and $c_l$ are the symplectic propagator coefficients, and it can be observed that $U^{\alpha}\neq 0$ $V^{\alpha}=0$ ($\alpha\geq 2$). Perform Taylor series expansion to $e^{d_l\Delta t V}$ in equation (12) to obtain:

$$e^{d_l\Delta t V} = I + d_l\Delta t V + \frac{(d_l\Delta t V)^2}{2!} + \cdots + \frac{(d_l\Delta t V)^n}{n!} + \cdots = I + d_l\Delta t V \tag{13}$$

Perform Taylor series expansion to $e^{c_l\Delta t U}$ in equation (12) to obtain:

$$e^{c_l\Delta t U} = I + c_l\Delta t U + \frac{(c_l\Delta t U)^2}{2!} + \cdots + \frac{(c_l\Delta t U)^n}{n!} + \cdots = G \tag{14}$$

According to the form of matrix U in equation (11), it can be written as follows:

$$U = \begin{bmatrix} 0 & u_{12} & 0 \\ 0 & 0 & 0 \\ 0 & u_{32} & u_{33} \end{bmatrix} \tag{15}$$

Then $$U^2 = \begin{bmatrix} 0 & 0 & 0 \\ 0 & 0 & 0 \\ 0 & u_{32}u_{33} & u_{33}^2 \end{bmatrix} \tag{16}$$

$$\vdots$$

$$U^n = \begin{bmatrix} 0 & 0 & 0 \\ 0 & 0 & 0 \\ 0 & u_{32}u_{33}^{n-1} & u_{33}^2 \end{bmatrix}$$

Except for zero elements in matrix G, the other elements are:

$$b_{11} = b_{22} = 1 \tag{17}$$

$$b_{12} = \alpha u_{12} \tag{18}$$

$$\begin{aligned} b_{32} &= \alpha u_{32} + \frac{\alpha^2 u_{32}u_{33}}{2!} + \cdots + \frac{\alpha^n u_{32}u_{33}^{n-1}}{n!} \\ &= \frac{u_{32}}{u_{33}}\left(1 + \alpha u_{33} + \frac{\alpha^2 u_{33}}{2!} + \cdots + \frac{\alpha^n u_{33}^{n-1}}{n!} - 1\right) \\ &= \frac{u_{32}}{u_{33}}\left(e^{\alpha u^{33}} - 1\right) \end{aligned} \tag{19}$$

$$b_{33} = 1 + \alpha u_{33} + \frac{\alpha^2 u_{33}}{2!} + \cdots + \frac{(\alpha u_{33})^n}{n!} = e^{\alpha u 33} \tag{20}$$

Therefore, according to the Taylor series expansion form of the exponential matrix $e^{d_l\Delta t V}$ and $e^{c_l\Delta t U}$ (equations (13) and (14)), the symplectic discretization form of the field component $\Psi = (J, , )^T$ in order l is:

$$E^{n+l/m}=E^{n+(l-1)/m}+\frac{d_l\Delta t}{\varepsilon_0}\nabla\times H^{n+l/m}+\frac{-d_l\Delta t}{\varepsilon_0}J^{n+l/m} \tag{21}$$

$$H^{n+l/m}=H^{n+(l-1)/m}+\frac{-c_l\Delta t}{\mu_0}\nabla\times E^{n+(l-1)/m} \tag{22}$$

$$J^{n+l/m}=e^{c_l\Omega\Delta t}J^{n+(l-1)/m}+\varepsilon_0\omega_p^2\Omega^{-1}\left(e^{c_l\Omega\Delta t}-I\right)E^{n+(l-1)/m} \tag{23}$$

Equations (21), (22), and (23) represent the symplectic discretization form of anisotropic magnetized plasma in a symplectic framework. equations (21) and (22) can be directly used for numerical iteration to solve E and H. But for equation (23), it can be seen from equation (5) that Ω is a 3×3 matrix, and further processing of the exponential matrix operator $e^{c_l\Omega\Delta t}$ is required, to obtain its equivalent 3×3 matrix form before obtaining the specific numerical iteration equation for equation (23).

For the exponential matrix coefficients $e^{c_l\Omega\Delta t}$, let $C=c_l\Omega$, then according to equation (5), it can be obtained that $$C=\begin{bmatrix}-\nu c_l & -\omega_{bz}c_l & \omega_{by}c_l\\ \omega_{bz}c_l & -\nu c_l & -\omega_{bx}c_l\\ -\omega_{by}c_l & \omega_{bx}c_l & -\nu c_l\end{bmatrix} \tag{24}$$

Due to the fact that the elements in matrix C are all non-zero, it is difficult to obtain the equivalent polynomial function of the exponential matrix operator $e^{\Omega}$ by Taylor series expansion.

The matrix index $e^{Ct}$ can be expanded into the following form:

$$e^{Ct}=x_1(t)I+x_2(t)C+x_3(t)C^2 \tag{25}$$

Wherein, $\lambda_1$, $\lambda_2$, and $\lambda_3$ are the characteristic value of the matrix C, $$\lambda_1=-\nu c_l \tag{26}$$

$$\lambda_2=-\nu c_l+c_l\left(-\omega_{bx}^2-\omega_{by}^2-\omega_{bz}^2\right)^{1/2} \tag{27}$$

$$\lambda_3=-\nu c_l-c_l\left(-\omega_{bx}^2-\omega_{by}^2-\omega_{bz}^2\right)^{1/2} \tag{28}$$

Since $\lambda_1$, $\lambda_2$, and $\lambda_3$ are not equal to each other, the general solution can be written as:

$$x_i(t)=a_{i1}e^{\lambda_1 t}+a_{i2}e^{\lambda_2 t}+a_{i3}e^{\lambda_3 t}\infty \tag{29}$$

Wherein, $a_{i1}$, $a_{i2}$ and $a_{i3}$ (i=1, 2, 3) represent coefficients. In addition, the general solution satisfies the following initial conditions:

(1) x(0)=1, x'(0)=0, x"(0)=0, substitute it into equation (29) to obtain $$x_1(t)=a_{11}e^{\lambda_1 t}+a_{12}e^{\lambda_2 t}+a_{13}e^{\lambda_3 t} \tag{30}$$

Wherein $$a_{11}=\frac{\lambda_2\lambda_3}{(\lambda_1-\lambda_2)(\lambda_1-\lambda_3)} \tag{31}$$

$$a_{12}=\frac{-\lambda_1\lambda_3}{(\lambda_1-\lambda_2)(\lambda_2-\lambda_3)} \tag{32}$$

$$a_{13}=\frac{\lambda_1\lambda_2}{\lambda_1\lambda_2-\lambda_1\lambda_3-\lambda_2\lambda_3+\lambda_3^2} \tag{33}$$

(2) x(0)=0, x'(0)=1, x"(0)=0, then obtain:

$$x_2(t)=a_{21}e^{\lambda_1 t}+a_{22}e^{\lambda_2 t}+a_{23}e^{\lambda_3 t} \tag{34}$$

Wherein $$a_{21}=\frac{-\lambda_2-\lambda_3}{(\lambda_1-\lambda_2)(\lambda_1-\lambda_3)} \tag{35}$$

$$a_{22}=\frac{\lambda_1+\lambda_3}{(\lambda_1-\lambda_2)(\lambda_2-\lambda_3)} \tag{36}$$

$$a_{23}=\frac{-\lambda_1-\lambda_2}{\lambda_1\lambda_2-\lambda_1\lambda_3-\lambda_2\lambda_3+\lambda_3^2} \tag{37}$$

(3) x(0)=0, x'(0)=0, x"(0)=1, then obtain:

$$x_3(t)=a_{31}e^{\lambda_1 t}+a_{32}e^{\lambda_2 t}+a_{33}e^{\lambda_3 t} \tag{38}$$

Wherein $$a_{31}=\frac{1}{(\lambda_1-\lambda_2)(\lambda_1-\lambda_3)} \tag{39}$$

$$a_{32}=\frac{-1}{(\lambda_1-\lambda_2)(\lambda_2-\lambda_3)} \tag{40}$$

$$a_{33}=\frac{1}{\lambda_1\lambda_2-\lambda_1\lambda_3-\lambda_2\lambda_3+\lambda_3^2} \tag{41}$$

Substitute equations (26)-(41) into equation (25), and the exponential matrix $e^{Ct}$ can be represented as a 3×3 matrix. Due to the complexity representation of the matrix $e^{Ct}$ and its ease of calculation, it is not provided in this disclosure for brevity. Next, change t to Δt, let $D=e^{C\Delta t}$, and then equation (25) becomes:

$$D=e^{C\Delta t}=x_1(\Delta t)I+x_2(\Delta t)C+x_3(\Delta t)C^2 \tag{42}$$

Substitute equation (42) into equation (23) and let $F=\Omega^{-1}(D-I)$, then the symplectic discretization form of the current source J is:

$$J^{n+l/m}=DJ^{n+(l-1)/m}+\varepsilon_0\omega_p^2FE^{n+(l-1)/m} \tag{43}$$

Finally, equations (21), (22), and (43) represent the symplectic iterative form of electromagnetic field components in anisotropic magnetized plasma medium under multi-level symplectic integration approximation.

Step 103: using a matrix exponential time-domain finite difference method to obtain numerical iterative equations for the electric field intensity, the magnetic field intensity, and the polarization current density in anisotropic magnetized plasma medium based on the electric field intensity, the magnetic field intensity, and the polarization current density after processed.

For the convenience of description, taking the x-direction as an example, the iterative equation of the ME-SFDTD (4,4) method for the electromagnetic field components in the x-direction involved is (spatial partial derivatives are approximated using fourth-order difference):

$$\begin{aligned} E_x^{n+l/m}\left(i+\frac{1}{2}, j, k\right) = {} & E_x^{n+(l-1)/m}\left(i+\frac{1}{2}, j, k\right) + \frac{d_l\Delta t}{\varepsilon_0} \times \\ & \left\{\gamma_{y1}\left[H_z^{n+l/m}\left(i+\frac{1}{2}, j+\frac{1}{2}, k\right) - H_z^{n+l/m}\left(i+\frac{1}{2}, j-\frac{1}{2}, k\right)\right] + \right. \\ & \gamma_{z1}\left[-H_y^{n+l/m}\left(i+\frac{1}{2}, j, k+\frac{1}{2}\right) + H_y^{n+l/m}\left(i+\frac{1}{2}, j, k-\frac{1}{2}\right)\right] + \\ & \gamma_{y2}\left[H_z^{n+l/m}\left(i+\frac{1}{2}, j+\frac{3}{2}, k\right) - H_z^{n+l/m}\left(i+\frac{1}{2}, j-\frac{3}{2}, k\right)\right] + \\ & \left.\gamma_{z2}\left[-H_y^{n+l/m}\left(i+\frac{1}{2}, j, k+\frac{3}{2}\right) + H_y^{n+l/m}\left(i+\frac{1}{2}, j, k-\frac{3}{2}\right)\right]\right\} - \\ & \frac{d_l\Delta t}{\varepsilon_0} J_x^{n+(l-1)/m}\left(i+\frac{1}{2}, j, k\right) \end{aligned} \tag{11}$$

$$\begin{aligned} J_x^{n+\frac{l}{m}}\left(i+\frac{1}{2}, j, k\right) = {} & \left[\cos(\omega_b c_l dt)e^{-\nu c_l dt}\right] J_x^{n+\frac{l-1}{m}}\left(i+\frac{1}{2}, j, k\right) + \\ & \left[\sin(\omega_b c_l dt)e^{-\nu c_l dt}\right] J_y^{n+\frac{l-1}{m}}\left(i+\frac{1}{2}, j, k\right) + \\ & \frac{\nu\left[1-\cos(\omega_b c_l dt)e^{-\nu c_l dt}\right]}{\nu^2+\omega_b^2} E_x^{n+\frac{l-1}{m}}\left(i+\frac{1}{2}, j, k\right) - \\ & \frac{\nu \sin(\omega_b c_l dt)e^{-\nu c_l dt}}{\nu^2+\omega_b^2} E_y^{n+\frac{l-1}{m}}\left(i+\frac{1}{2}, j, k\right) \end{aligned} \tag{45}$$

$$\begin{aligned} H_x^{n+l/m}\left(i, j+\frac{1}{2}, k+\frac{1}{2}\right) = {} & H_x^{n+(l-1)/m}\left(i, j+\frac{1}{2}, k+\frac{1}{2}\right) + \frac{c_l\Delta t}{\mu_0} \times \\ & \left\{\gamma_{z1}\left[H_z^{n+l/m}\left(i, j+\frac{1}{2}, k+1\right) - E_y^{n+(l-1)/m}\left(i, j+\frac{1}{2}, k\right)\right] + \right. \\ & \gamma_{y1}\left[-H_y^{n+l/m}\left(i, j+1, k+\frac{1}{2}\right) + E_z^{n+(l-1)/m}\left(i, j, k+\frac{1}{2}\right)\right] + \\ & \gamma_{z2}\left[H_z^{n+l/m}\left(i, j+\frac{1}{2}, k+2\right) - E_y^{n+(l-1)/m}\left(i, j+\frac{1}{2}, k-1\right)\right] + \\ & \left.\gamma_{y2}\left[-H_y^{n+l/m}\left(i, j+2, k+\frac{1}{2}\right) + E_z^{n+(l-1)/m}\left(i, j-1, k+\frac{1}{2}\right)\right]\right\} \end{aligned} \tag{46}$$

Wherein, $$\gamma_{y1} = \frac{9}{8}\frac{1}{\Delta y}, \gamma_{y2} = \frac{-1}{24}\frac{1}{\Delta y}, \gamma_{z1} = \frac{9}{8}\frac{1}{\Delta z} \text{ and } \gamma_{z2} = \frac{-1}{24}\frac{1}{\Delta z},$$

the numerical discretization forms of field components in other direction are similar.

It should be noted that, the current density position is the same as the electric field position. Therefore, when calculating $$J_x^{n+l/m}\left(i+\frac{1}{2}, j, k\right),$$

it is necessary to perform interpolation on $$J_y^{n-l/m}\left(i+\frac{1}{2}, j, k\right) \text{ and } E_y^{n-l/m}\left(i+\frac{1}{2}, j, k\right),$$

because $J_y$ and $E_y$ are no value at the spatial coordinate $$\left(i+\frac{1}{2}, j, k\right),$$

so it is necessary to obtain an average weighted approximation from the values of four adjacent field components:

$$\begin{aligned} J_y^{n+l/m}\left(i+\frac{1}{2}, j, k\right) = {} & \frac{1}{4}\left(J_y^{n+l/m}\left(i, j-\frac{1}{2}, k\right) + \right. \\ & \left. J_y^{n+l/m}\left(i, j+\frac{1}{2}, k\right) + J_y^{n+l/m}\left(i+1, j+\frac{1}{2}, k\right) + J_y^{n+l/m}\left(i+1, j-\frac{1}{2}, k\right)\right) \end{aligned} \tag{47}$$

$$\begin{aligned} E_y^{n+l/m}\left(i+\frac{1}{2}, j, k\right) = {} & \frac{1}{4}\left(E_y^{n+l/m}\left(i, j-\frac{1}{2}, k\right) + \right. \\ & \left. E_y^{n+l/m}\left(i, j+\frac{1}{2}, k\right) + E_y^{n+l/m}\left(i+1, j+\frac{1}{2}, k\right) + E_y^{n+l/m}\left(i+1, j-\frac{1}{2}, k\right)\right) \end{aligned} \tag{48}$$

For the convenience of description, consider the numerical stability in one-dimensional cases. When simulating anisotropic magnetized plasma medium, define each field component in the spatial domain as $$\phi_s^n = \phi_0\zeta^n \ \hat{\exp}(jk_{num}s\Delta) \tag{49}$$

Wherein, $j=\sqrt{-1}$, represents the modulus of the field component, $\zeta$ represents the growth factor, n is the time factor, s is the spatial factor, $k_{num}$ represents the numerical wavenumber, and $\Delta$ represents the spatial step size.

By substituting (49) into equations (21), (22), and (23), the iterative equations for the field components of anisotropic magnetized plasma medium can be obtained (from time n to n+l/m):

$$\Psi_{L1}^{n+l/m} = M_{R1}^n \tag{50}$$

Wherein $\Psi=[H_x,H_y,E_x,E_y,J_x,J_y]^T$.

According to equation (50), the numerical iteration equation for the m-stage and p-order ME-SFDTD method from n to n+1 time steps can be written in the following matrix form:

$$\prod_{l=0}^{m-1} \Psi_{L(m-l)}^{n+1} = \prod_{l=0}^{m-l^n}{}_{R(m-l)} \tag{51}$$

$$M_{Li} = \begin{bmatrix} \zeta^{c_i} & 0 & 0 & 0 & 0 & 0 \\ 0 & \zeta^{ci} & 0 & 0 & 0 & 0 \\ 0 & d_iF_2D_z\zeta^{c_i} & \zeta^{d_i} & 0 & d_iF_3\zeta^{c_i} & 0 \\ -d_iF_2D_z\zeta^{c_i} & 0 & 0 & \zeta^{d_i} & 0 & d_iF_3\zeta^{c_i} \\ 0 & 0 & 0 & 0 & \zeta^{c_i} & 0 \\ 0 & 0 & 0 & 0 & 0 & \zeta^{c_i} \end{bmatrix} \tag{52}$$

-continued $$M_{Ri}=\begin{bmatrix}1&0&0&c_iF_1D_z&0&0\\0&1&-c_iF_1D_z&0&0&0\\0&0&1&0&0&0\\0&0&0&1&0&0\\0&0&\varepsilon\omega_p^2P_i&-\varepsilon\omega_p^2Q_i&A_i&-B_i\\0&0&\varepsilon\omega_p^2Q_i&\varepsilon\omega_p^2P_i&B_i&A_i\end{bmatrix}\tag{53}$$

Wherein, $$F_1=\frac{\Delta t}{\mu\Delta z},\ F_2=\frac{\Delta t}{\varepsilon\Delta z},\ F_3=\frac{\Delta t}{\varepsilon},\ A_i=\cos(\omega_bc_idt)e^{-vc_idt},$$

$$B_i=\sin(\omega_bc_idt)e^{-vc_idt},\ D_z=\frac{\hat{j}}{4}\left[9\sin\left(\frac{k_{num}\Delta}{2}\right)-\frac{1}{3}\sin\left(\frac{3k_{num}\Delta}{2}\right)\right],$$

$$j=\sqrt{-1},\ P_i=\frac{v\left[1-\cos(\omega_bc_idt)e^{-vc_idt}\right]}{v^2+\omega_b^2}+\frac{\omega_b\sin(\omega_bc_idt)e^{-vc_idt}}{v^2+\omega_b^2},$$

$$Q_i=\frac{v\sin(\omega_bc_idt)e^{-vc_idt}}{v^2+\omega_b^2}+\frac{\omega_b\left[\cos(\omega_bc_idt)e^{-vc_idt}-1\right]}{v^2+\omega_b^2},$$

i (i=1, 2, 3, . . . , m) stands for the sub-stage.

Substitute equations (52) and (53) into equation (51) to obtain:

$$\mathcal{M}^n=\left(\prod_{l=0}^{m-1}M_{L(m-l)}-\prod_{l=0}^{m-1}{}_{R(m-l)}\right)^n=0\tag{54}$$

To ensure that equation (54) has a non-zero solution, the determinant of its coefficient matrix M must be 0 (the expression of the coefficient matrix M is easily derived). Meanwhile, in order to ensure the numerical stability of the SFDTD (4,4) method, the modulus of the growth factor ζ must be less than or equal to 1. Although the expression for the growth factor ζ can be obtained by solving the determinant of matrix M, the expression for the growth factor ζ is complex and difficult to determine value range of ζ through the expression. Another feasible solution is to substitute the values of the parameters into the matrix M to calculate the numerical size of ζ. According to equations (7) and (8), it is known that the parameters in matrix M contain $\omega_b$, $\omega_p$, Δz, Δt, v, and $\sigma_2$. In numerical calculations, let Δz=75 μm, Δt=0.125 ps, v=20 GHZ, $\omega_b$=100 Grad/s, and $\omega_p$=15.53 Grad/s. Due to $$\hat{\sigma_z}=\frac{j}{4}\left(9\sin\left(\frac{k_{num}\Delta z}{2}\right)-\frac{1}{3}\sin\left(\frac{3k_{num}\Delta z}{2}\right)\right),$$

considering the symmetry of trigonometric functions, the range of values for $k_{num}$Δz is from 0 to π.

Figure 2:
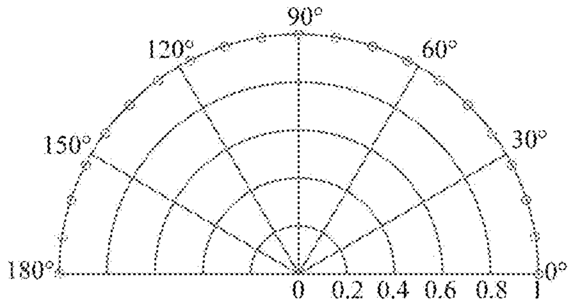
FIG. 2 shows the variation trend of the modulus value of growth factor $\zeta$ with knumz.

As shown in FIG. 2, at kΔz=[0, π], The modulus of c is within and on the unit circle, indicating that the ME-SFDTD (4,4) method proposed in the present disclosure can maintain stability in numerical iterations.

When calculating the dispersion error of the numerical method, it is necessary to obtain the value of the numerical wavenumber $k_{num}$, and the calculation process is similar to the solving process in part A. Let $$\zeta=e^{j\omega\Delta t}\tag{55}$$

Substitute equation (55) into (54) and let det(M)=0, then the expression for the numerical wavenumber $k_{num}$ of the SFDTD (4,4) method can be solved (The parameter values of $\omega_b$, $\omega_p$, Δz, Δt and v are the same as the settings in the stability analysis section.

The analytical dispersion relationship between left-handed circularly polarized waves and right-handed circularly polarized waves in magnetized plasma is as follows:

$$\left(\frac{k_{R,L}c}{\omega}\right)^2=1-\frac{\omega_p^2}{\omega^2\left[(1-jv/\omega)\pm(\omega_b/\omega)\right]}\tag{56}$$

Wherein, $K_{R,L}$ is the complex wave number, and the subscripts R and L represent the right-handed circularly polarized waves (RCP) and the left-handed circularly polarized waves (LCP), respectively. The dispersion error is defined as $$Re(k_{num}-k_{R,L})/Re(k_{R,L})\tag{57}$$

Figure 3:
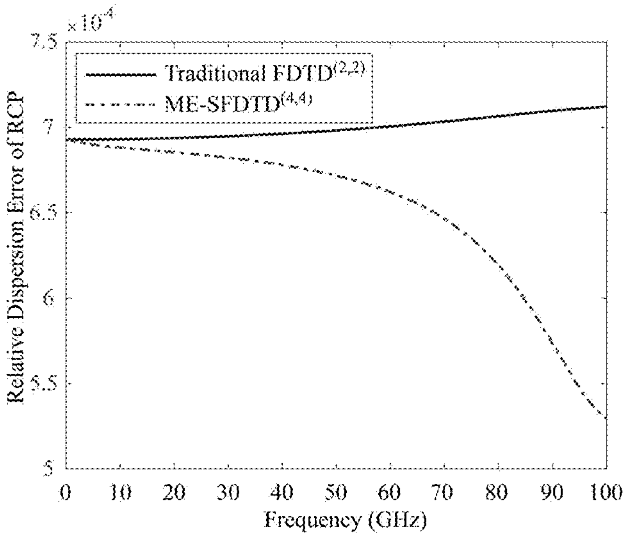
FIG. 3 is a change curve of dispersion error of RCP waves with electromagnetic wave frequency.
Figure 4:
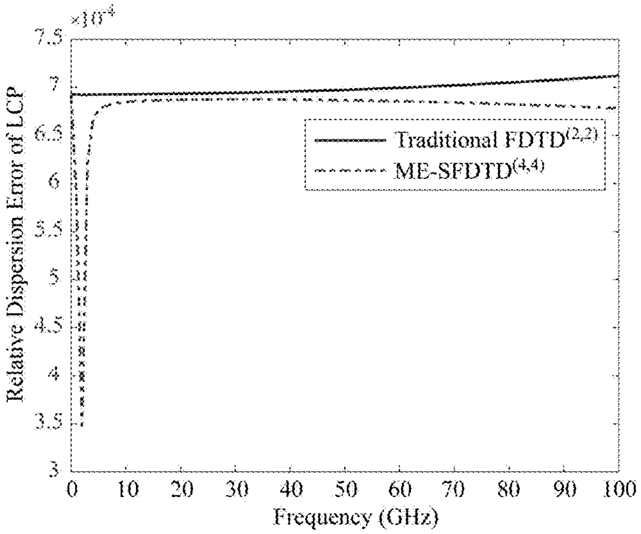
FIG. 4 is a change curve of dispersion error of LCP waves with electromagnetic wave frequency.
Figure 5:
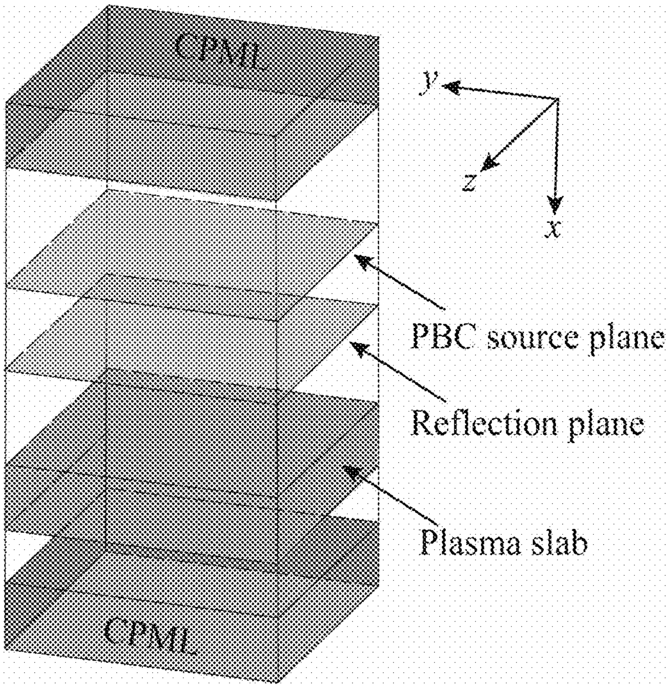
FIG. 5 is a geometric schematic diagram of anisotropic magnetized plasma slab.

FIG. 3 and FIG. 4 respectively show the relationship between the dispersion error of FDTD (2,2) method and SFDTD (4,4) method and the frequency of electromagnetic waves, showing the numerical dispersion errors of the right-handed circularly polarized waves and the left-handed circularly polarized waves. It can be seen that the SFDTD (4,4) method has lower dispersion error compared to the FDTD (2,2) method.

Step 104: applying a numerical modeling simulation electromagnetic model to determine electromagnetic characteristics of the electromagnetic model according to the numerical iterative equations for the electric field intensity, the magnetic field intensity, and the polarization current density in the anisotropic magnetized plasma medium. The electromagnetic model includes an anisotropic magnetized plasma slab model, a blunt cone model, and a sphere model.

For the plasma slab model:

The reflection characteristics of anisotropic magnetized plasma slab are calculated through FDTD (2,2) method, and ME-SFDTD (4,4) method using analytical method. As shown in FIG. 4, transverse electromagnetic waves propagate in the z-direction. The simulation area contains 400×9×9 Yee grids, with the plasma slab occupying 200 grids in the x-direction. The size of the grid is Δx=Δy=Δz=75 μm. The calculation area is set as periodic boundary conditions in the y-direction and z-direction, and CPML technology is used to truncate at both ends of the x-direction. The parameters of magnetized plasma are: v=20 GHZ, $\omega_b$=100 Grad/s, $\omega_p$=15.53 Grad/s. The incident electromagnetic wave source adopts the parameters introduced in reference [1], wherein $$\text{Gaussian}(t)=\exp\left(-\frac{4\pi(t-t_0)^2}{\tau^2}\right)\tag{58}$$

Wherein, τ=150Δt, Δt=0.125 ps, $t_0$=0.87.

Figure 6:
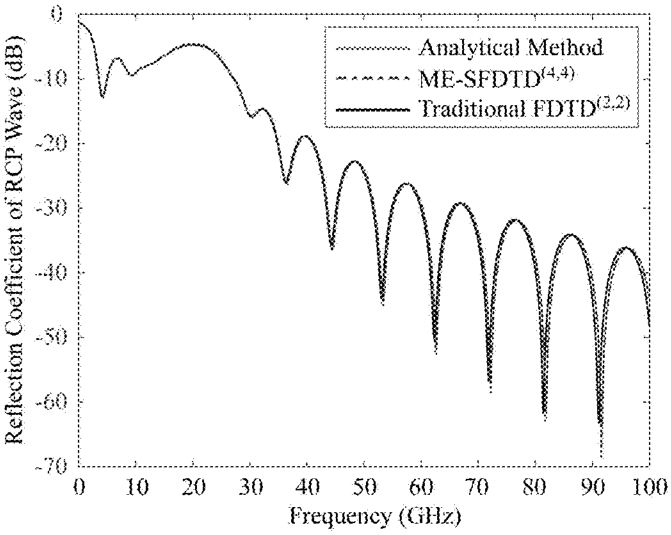
FIG. 6 is a change curve of the reflection coefficient of RCP waves with frequency.
Figure 7:
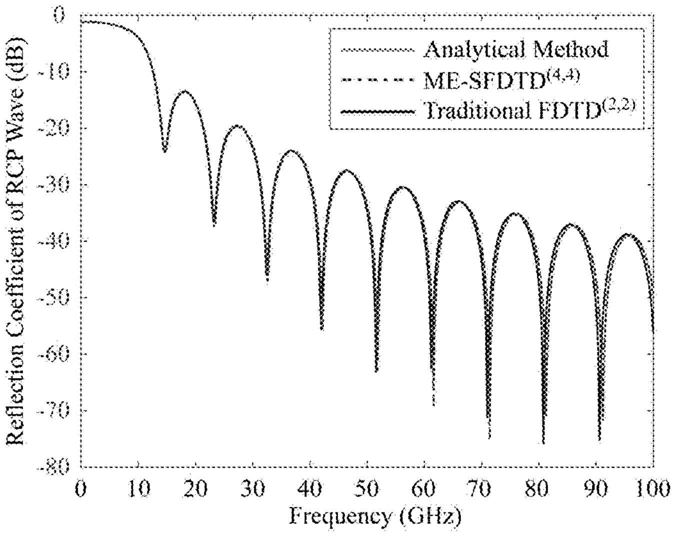
FIG. 7 is a change curve of the reflection coefficient of LCP waves with frequency.

FIG. 6 and FIG. 7 respectively show the reflection coefficients of the right-handed circularly polarized waves and the left-handed circularly polarized waves. It can be clearly observed that compared to the FDTD (2,2) method, the results obtained by the ME-SFDTD (4,4) method are closer to the analytical method, verifying the correctness of the proposed method.

Figure 8:
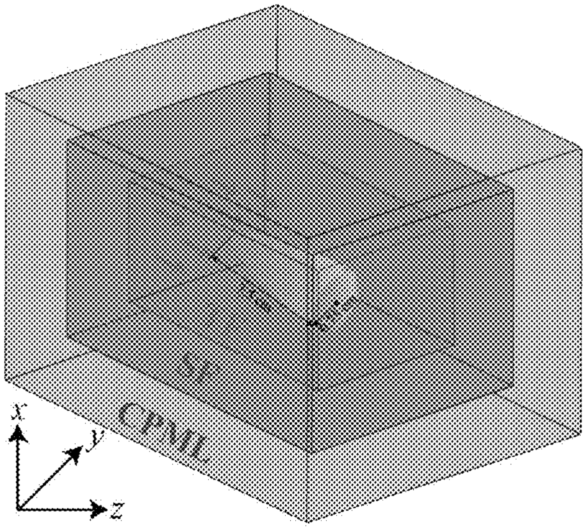
FIG. 8 is a simulation model of a three-dimensional blunt cone.
Figure 9:
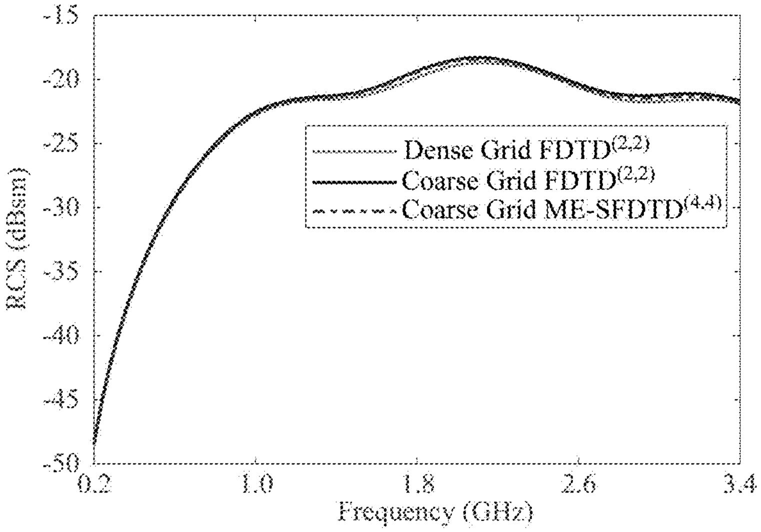
FIG. 9 is the RCS result of the three-dimensional blunt cone.

For blunt cone model:

Generally speaking, the tip of a high-altitude flying target is similar to a blunt cone, so the anisotropic magnetized plasma blunt cone is modeled and simulated, and its single station RCS is calculated. As shown in FIG. 8, the blunt cone is placed in the total field area, with the adjacent area being the scattering field area and the outermost layer being the absorption layer. In order to better absorb scattered electromagnetic waves, a convolutional perfectly matched layer is used as the absorbing boundary condition. The simulation area contains 80×80×80 grids, with a grid size of $\Delta x=\Delta y=\Delta z=0.25$ cm. The bottom radius of the blunt cone model is 0.75 cm and the length of the blunt cone model is 7.5 cm. The parameters of magnetized plasma are: v=20 GHZ, $\omega_b=20$ Grad/s, and $\omega_p=180.32$ Grad/s. The Gaussian plane waves are introduced by the total field/scattered field technique, and the time-domain form of the Gaussian waveform is the same as formula (58), wherein $\tau=80\Delta t$, $\Delta t=4.167$ ps, $t_0=0.87$. In numerical simulation, in order to compare and verify the correctness of the proposed method, the RCS results calculated using the fine grid FDTD (2,2) method are used as the benchmark. FIG. 9 shows the RCS results calculated using several different numerical methods. It can be observed that compared to the coarse grid FDTD (2,2) method, the ME-SFDTD (4,4) method results are closer to the coarse grid FDTD (2,2) method. In addition, in order to quantitatively analyze the calculation error, formula (59) is used to calculate the calculation error of numerical methods:

$$E_r(f) = \frac{|E(f)_{num} - E(f)_{Dense\ Grid}|}{\max|E(f)_{Dense\ Grid}|} \times 100\% \tag{59}$$

Figure 10:
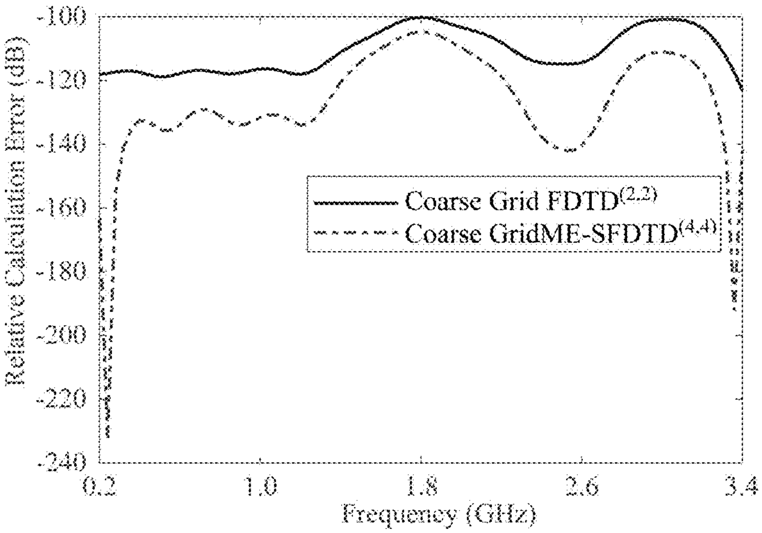
FIG. 10 shows the relative calculation errors of the two methods.

Wherein, $E(f)_{num}$ represents the results obtained by the coarse grid FDTD (2,2) method and the coarse grid ME-SFDTD (4,4) method, while $E(f)_{DenseGrid}$ represents the results obtained by the fine grid FDTD (2,2) method. FIG. 10 shows the relative numerical calculation errors of the two methods, and it can be observed that the ME-SFDTD (4,4) method has lower numerical calculation errors, once again verifying the correctness of the proposed method.

Figure 11:
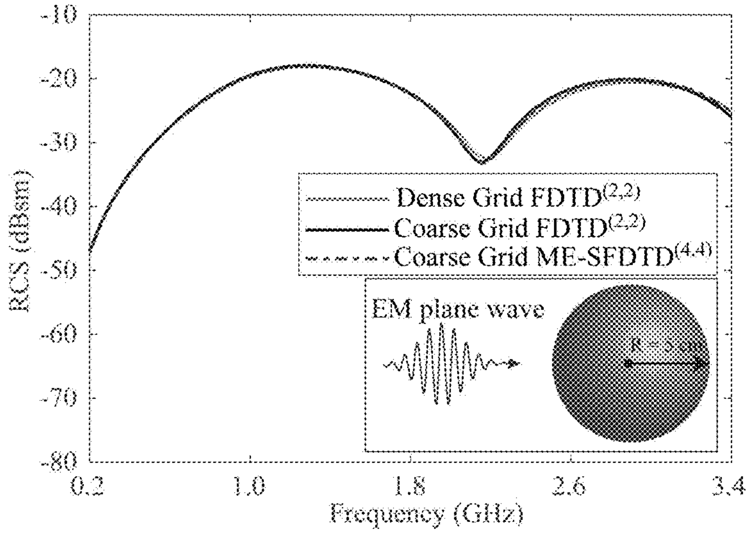
FIG. 11 is the RCS result of a three-dimensional sphere.
Figure 12:
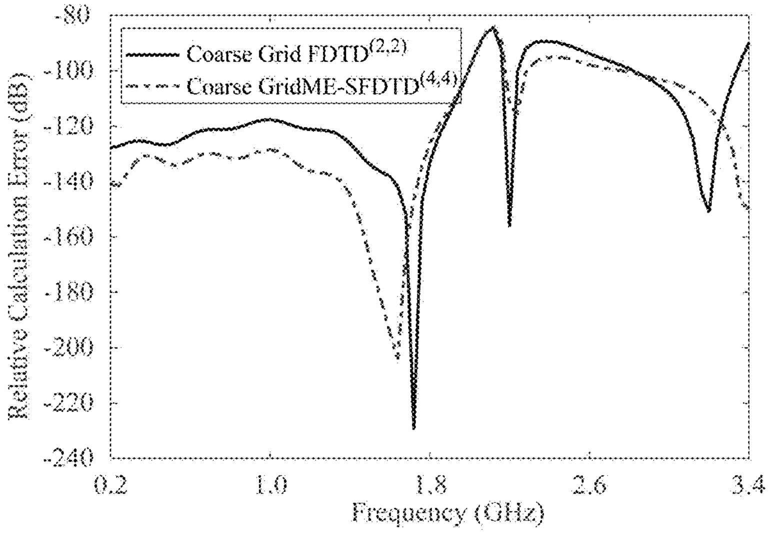
FIG. 12 shows the relative calculation errors of the two methods.

For sphere model:

Finally, the RCS of the plasma sphere is also calculated. In numerical simulation, the settings for time step, space step, plasma parameters, and calculation space size are the same as in Example B. Just replace the blunt cone in FIG. 8 with a sphere, with a radius of R=5 cm. FIG. 11 and FIG. 12 show the RCS calculation results and relative numerical calculation errors, respectively. It can be observed that the proposed ME-SFDTD (4,4) method provides more accurate results compared to the traditional FDTD (2,2) method.

The present disclosure combines the matrix exponential method and the SFDTD (4,4) method with high order numerical accuracy in both time and space to simulate the propagation characteristics of electromagnetic waves in anisotropic magnetized plasma medium. Firstly, a unified matrix form and a time multi-level symplectic discretization process of the Maxwell equation and the polarization current density equation are established. Then, the exponential matrix method is used to solve the matrix exponential coefficient terms included in the derived discrete equation. Finally, combined with the spatial fourth-order difference approximation method, a numerical iteration equation for the ME-SFDTD (4,4) method for processing anisotropic magnetized plasma medium is derived. In numerical simulation, compared to the traditional FDTD (2,2) method, the ME-SFDTD (4,4) method can more accurately simulate the electromagnetic characteristics of the anisotropic magnetized plasma slab, the blunt cone, and the sphere, fully verifying the correctness of this method.

Figure 13:
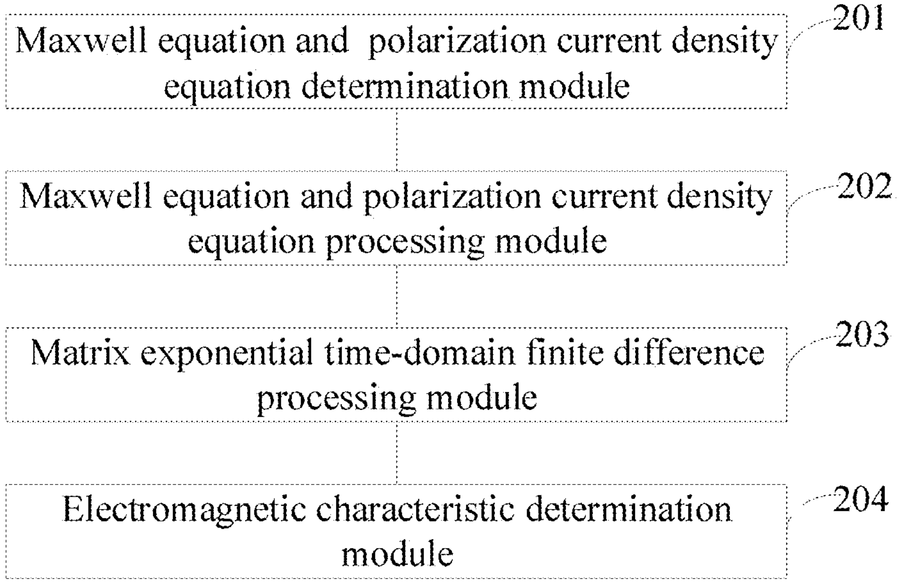
FIG. 13 is a structural diagram of the anisotropic magnetized plasma medium processing system of the present disclosure.

FIG. 13 shows the structural diagram of the anisotropic magnetized plasma medium processing system of the present disclosure. As shown in FIG. 13, a anisotropic magnetized plasma medium processing system includes:

A system for processing anisotropic magnetized plasma medium, comprising:

A Maxwell equation and polarization current density equation determination module 201, configured to obtain a Maxwell equation and a polarization current density equation based on electromagnetic characteristics of anisotropic magnetized plasma;

A Maxwell equation and polarization current density equation processing module 202, configured to process the Maxwell equation and the polarization current density equation to obtain the electric field intensity, the magnetic field intensity, and the polarization current density after processed;

A matrix exponential time-domain finite difference processing module 203, configured to obtain numerical iterative equations for electric field intensity, magnetic field intensity, and polarization current density in anisotropic magnetized plasma medium using the matrix exponential time-domain finite difference method based on the electric field intensity, the magnetic field intensity, and the polarization current density after processed; and An electromagnetic characteristic determination module 204, configured to determine electromagnetic characteristics of the electromagnetic model using a numerical modeling simulation electromagnetic model based on the numerical iterative equations of the electric field intensity, the magnetic field intensity, and the polarization current density in the anisotropic magnetized plasma medium.

The Maxwell equation in step 201 is:

$$\nabla \times E = -\mu_0 \frac{\partial H}{\partial t};$$

$$\nabla \times H = \varepsilon_0 \frac{\partial E}{\partial t} + J;$$

the polarization current density equation is:

$$\frac{dJ}{dt} + vJ = \varepsilon_0 \omega_p^2 E +_b \times;$$

wherein, E is a electric field intensity, H is a magnetic field intensity, J is a polarization current density, $\varepsilon_0$ and $\mu_0$ are respectively a dielectric constant and a permeability in vacuum, $\omega_p$ is a plasma frequency, v is a plasma collision frequency, $\omega_b = B_0/m_e$ is an electron cyclotron frequency, $B_0$ is an external static magnetic field, e is an electron charge, and $m_e$ is an electron mass.

The Maxwell equation and polarization current density equation processing module 202 specifically includes:

a Maxwell equation and polarization current density equation processing unit, configured to perform multi-level symplectic discretization on the Maxwell equation and the polarization current density equation to obtain the electric field intensity, the magnetic field intensity, and the polarization current density in the symplectic discretization format:

$$E^{n+l/m} = E^{n+(l-1)/m} + \frac{d_l \Delta t}{\varepsilon_0} \nabla \times H^{n+l/m} + \frac{-d_l \Delta t}{\varepsilon_0} J^{n+l/m}$$

$$H^{n+l/m} = H^{n+(l-1)/m} + \frac{-c_l \Delta t}{\mu_0} \nabla \times E^{n+(l-1)/m}$$

$$J^{n+l/m} = DJ^{n+(l-1)/m} + \varepsilon_0 \omega_p^2 F E^{n+(l-1)/m},$$

wherein, $d_l$ and $c_l$ are coefficients of the symplectic propagator, $$\Omega = \begin{bmatrix} -\nu & -\omega_{bz} & \omega_{by} \\ \omega_{bz} & -\nu & -\omega_{bx} \\ -\omega_{by} & \omega_{bx} & -\nu \end{bmatrix},$$

l is the order of a field component $W = E(J, , )^T$, and m is the number of stages of non-dissipative p-order symplectic integral, $D = e^{CM}$, $F = \Omega^{-1}(D - I)$.

The matrix exponential time-domain finite difference processing module 203 specifically includes:

a Matrix exponential time-domain finite difference processing unit, assuming that the plasma medium is biased by a static magnetic field in the z-direction, based on the electric field intensity, the magnetic field intensity, and the polarization current density after processed, the matrix exponential time-domain finite difference method is used to obtain numerical iterative equations for the electric field intensity, the magnetic field intensity, and the polarization current density in anisotropic magnetized plasma medium:

$$
\begin{aligned}
E_x^{n+l/m}\left(i+\tfrac{1}{2}, j, k\right) = {} & E_x^{n+(l-1)/m}\left(i+\tfrac{1}{2}, j, k\right) + \\
& \frac{d_l \Delta t}{\varepsilon_0} \times \left\{ \gamma_{y1}\left[H_z^{n+l/m}\left(i+\tfrac{1}{2}, j+\tfrac{1}{2}, k\right) - H_z^{n+l/m}\left(i+\tfrac{1}{2}, j-\tfrac{1}{2}, k\right)\right] + \right. \\
& \gamma_{z1}\left[-H_y^{n+l/m}\left(i+\tfrac{1}{2}, j, k+\tfrac{1}{2}\right) + H_y^{n+l/m}\left(i+\tfrac{1}{2}, j, k-\tfrac{1}{2}\right)\right] + \\
& \gamma_{y2}\left[H_z^{n+l/m}\left(i+\tfrac{1}{2}, j+\tfrac{3}{2}, k\right) - H_z^{n+l/m}\left(i+\tfrac{1}{2}, j-\tfrac{3}{2}, k\right)\right] + \\
& \left. \gamma_{z2}\left[-H_y^{n+l/m}\left(i+\tfrac{1}{2}, j, k+\tfrac{3}{2}\right) + H_y^{n+l/m}\left(i+\tfrac{1}{2}, j, k-\tfrac{3}{2}\right)\right] \right\} - \\
& \frac{d_l \Delta t}{\varepsilon_0} J_x^{n+(l-1)/m}\left(i+\tfrac{1}{2}, j, k\right)
\end{aligned}
$$

$$
\begin{aligned}
E_y^{n+l/m}\left(i, j+\tfrac{1}{2}, k\right) = {} & E_x^{n+(l-1)/m}\left(i, j+\tfrac{1}{2}, k\right) + \\
& \frac{d_l \Delta t}{\varepsilon_0} \times \left\{ \gamma_{z1}\left[H_x^{n+l/m}\left(i, j+\tfrac{1}{2}, k+\tfrac{1}{2}\right) - H_x^{n-l/m}\left(i, j+\tfrac{1}{2}, k-\tfrac{1}{2}\right)\right] + \right. \\
& \gamma_{x1}\left[-H_z^{n+l/m}\left(i+\tfrac{1}{2}, j+\tfrac{1}{2}, k\right) + H_z^{n+l/m}\left(i-\tfrac{1}{2}, j+\tfrac{1}{2}, k\right)\right] +
\end{aligned}
$$

-continued $$
\begin{aligned}
& \gamma_{z2}\left[H_x^{n+l/m}\left(i, j+\tfrac{1}{2}, k+\tfrac{3}{2}\right) - H_x^{n+l/m}\left(i, j+\tfrac{1}{2}, k-\tfrac{3}{2}\right)\right] + \\
& \left. \gamma_{x2}\left[-H_z^{n+l/m}\left(i+\tfrac{3}{2}, j+\tfrac{1}{2}, k\right) + H_z^{n+l/m}\left(i-\tfrac{3}{2}, j+\tfrac{1}{2}, k\right)\right] \right\} - \\
& \frac{d_l \Delta t}{\varepsilon_0} J_y^{n-(l-1)/m}\left(i, j+\tfrac{1}{2}, k\right)
\end{aligned}
$$

$$
\begin{aligned}
E_z^{n+l/m}\left(i, j, k+\tfrac{1}{2}\right) = {} & E_z^{n+(l-1)/m}\left(i, j, k+\tfrac{1}{2}\right) + \\
& \frac{d_l \Delta t}{\varepsilon_0} \times \left\{ \gamma_{x1}\left[H_y^{n+l/m}\left(i+\tfrac{1}{2}, j, k+\tfrac{1}{2}\right) - H_y^{n+l/m}\left(i-\tfrac{1}{2}, j, k+\tfrac{1}{2}\right)\right] + \right. \\
& \gamma_{y1}\left[-H_x^{n+l/m}\left(i, j+\tfrac{1}{2}, k+\tfrac{1}{2}\right) + H_x^{n+l/m}\left(i, j-\tfrac{1}{2}, k+\tfrac{1}{2}\right)\right] + \\
& \gamma_{x2}\left[H_y^{n+l/m}\left(i+\tfrac{3}{2}, j, k+\tfrac{1}{2}\right) - H_y^{n+l/m}\left(i-\tfrac{3}{2}, j, k+\tfrac{1}{2}\right)\right] + \\
& \left. \gamma_{y2}\left[-H_x^{n+l/m}\left(i, j+\tfrac{3}{2}, k+\tfrac{1}{2}\right) + H_x^{n+l/m}\left(i, j-\tfrac{3}{2}, k+\tfrac{1}{2}\right)\right] \right\} - \\
& \frac{d_l \Delta t}{\varepsilon_0} J_z^{n+(l-1)/m}\left(i, j, k+\tfrac{1}{2}\right)
\end{aligned}
$$

$$
\begin{aligned}
H_x^{n+l/m}\left(i, j+\tfrac{1}{2}, k+\tfrac{1}{2}\right) = {} & H_x^{n+(l-1)/m}\left(i, j+\tfrac{1}{2}, k+\tfrac{1}{2}\right) + \\
& \frac{c_l \Delta t}{\mu_0} \times \left\{ \gamma_{z1}\left[E_y^{n+(l-1)/m}\left(i, j+\tfrac{1}{2}, k+1\right) - E_y^{n+(l-1)/m}\left(i, j+\tfrac{1}{2}, k\right)\right] + \right. \\
& \gamma_{y1}\left[-E_z^{n-(l-1)/m}\left(i, j+1, k+\tfrac{1}{2}\right) + E_z^{n+(l-1)/m}\left(i, j, k+\tfrac{1}{2}\right)\right] + \\
& \gamma_{z2}\left[E_y^{n+(l-1)/m}\left(i, j+\tfrac{1}{2}, k+2\right) - E_y^{n+(l-1)/m}\left(i, j+\tfrac{1}{2}, k-1\right)\right] + \\
& \left. \gamma_{y2}\left[-E_z^{n-(l-1)/m}\left(i, j+2, k+\tfrac{1}{2}\right) + E_z^{n+(l-1)/m}\left(i, j-1, k+\tfrac{1}{2}\right)\right] \right\}
\end{aligned}
$$

$$
\begin{aligned}
H_y^{n-l/m}\left(i+\tfrac{1}{2}, j, k+\tfrac{1}{2}\right) = {} & H_y^{n-(l-1)/m}\left(i+\tfrac{1}{2}, j, k+\tfrac{1}{2}\right) + \\
& \frac{c_l \Delta t}{\mu_0} \times \left\{ \gamma_{x1}\left[E_z^{n+(l-1)/m}\left(i+1, j+\tfrac{1}{2}, k\right) - E_z^{n+(l-1)/m}\left(i, j, k+\tfrac{1}{2}\right)\right] + \right. \\
& \gamma_{z1}\left[-E_x^{n+(l-1)/m}\left(i+\tfrac{1}{2}, j, k+1\right) + E_x^{n+(l-1)/m}\left(i+\tfrac{1}{2}, j, k\right)\right] + \\
& \gamma_{x2}\left[E_z^{n+(l-1)/m}\left(i+2, j, k+\tfrac{1}{2}\right) - E_z^{n+(l-1)/m}\left(i-1, j, k+\tfrac{1}{2}\right)\right] + \\
& \left. \gamma_{z2}\left[-E_x^{n+(l-1)/m}\left(i+\tfrac{1}{2}, j, k+2\right) + E_x^{n+(l-1)/m}\left(i+\tfrac{1}{2}, j, k-1\right)\right] \right\}
\end{aligned}
$$

$$
\begin{aligned}
H_z^{n-l/m}\left(i+\tfrac{1}{2}, j+\tfrac{1}{2}, k\right) = {} & H_z^{n-(l-1)/m}\left(i+\tfrac{1}{2}, j+\tfrac{1}{2}, k\right) + \\
& \frac{c_l \Delta t}{\mu_0} \times \left\{ \gamma_{y1}\left[E_x^{n+(l-1)/m}\left(i+\tfrac{1}{2}, j+1, k\right) - E_x^{n+(l-1)/m}\left(i+\tfrac{1}{2}, j, k\right)\right] + \right. \\
& \gamma_{x1}\left[-E_y^{n+(l-1)/m}\left(i+1, j+\tfrac{1}{2}, k\right) + E_y^{n+(l-1)/m}\left(i, j+\tfrac{1}{2}, k\right) + \right. \\
& \gamma_{y2}\left[E_x^{n+(l-1)/m}\left(i+\tfrac{1}{2}, j+2, k\right) - E_x^{n+(l-1)/m}\left(i+\tfrac{1}{2}, j-1, k\right)\right] + \\
& \left. \gamma_{x2}\left[-E_y^{n+(l-1)/m}\left(i+2, j+\tfrac{1}{2}, k\right) + E_y^{n+(l-1)/m}\left(i-1, j+\tfrac{1}{2}, k\right)\right] \right\}
\end{aligned}
$$

$$
\begin{aligned}
J_x^{n+\frac{l}{m}}\left(i+\tfrac{1}{2}, j, k\right) = {} & \left[\cos(\omega_b c_l dt) e^{-\nu c_l dt}\right] J_x^{n+\frac{l-1}{m}}\left(i+\tfrac{1}{2}, j, k\right) + \\
& \left[\sin(\omega_b c_l dt) e^{-\nu c_l dt}\right] J_y^{n+\frac{l-1}{m}}\left(i+\tfrac{1}{2}, j, k\right) + \varepsilon_0 \omega_p^2 \left\{ \frac{\nu\left[1 - \cos(\omega_b c_l dt) e^{-\nu c_l dt}\right]}{\nu^2 + \omega_b^2} + \right. \\
& \left. \frac{\omega_b \sin(\omega_b c_l dt) e^{-\nu c_l dt}}{\nu^2 + \omega_b^2} \right\} E_x^{n+\frac{l-1}{m}}\left(i+\tfrac{1}{2}, j, k\right) + \varepsilon_0 \omega_p^2 \left\{ \frac{\nu \sin(\omega_b c_l dt) e^{-\nu c_l dt}}{\nu^2 + \omega_b^2} + \right. \\
& \left. \frac{\omega_b\left[\cos(\omega_b c_l dt) e^{-\nu c_l d} - 1\right]}{\nu^2 + \omega_b^2} \right\} E_y^{n+\frac{l-1}{m}}\left(i+\tfrac{1}{2}, j, k\right)
\end{aligned}
$$

because a current density position is the same as an electric field position, therefore, when calculating $$J_x^{n+l/m}\left(i+\frac{1}{2},j,k\right),$$

it is necessary to perform interpolation on $$J_y^{n-l/m}\left(i+\frac{1}{2},j,k\right) \text{ and } E_y^{n-l/m}\left(i+\frac{1}{2},j,k\right),$$

because $J_y$ and $E_y$ are no value at a point $$\left(i+\frac{1}{2},j,k\right),$$

so it needs to be averaged by four adjacent diagonal values to obtain:

$$J_y^{n-l/m}\left(i+\frac{1}{2},j,k\right)=\frac{1}{4}\left(J_y^{n-l/m}\left(i,j-\frac{1}{2},k\right)+J_y^{n-l/m}\left(i,j+\frac{1}{2},k\right)+J_y^{n-l/m}\left(i+1,j+\frac{1}{2},k\right)+J_y^{n-l/m}\left(i+1,j-\frac{1}{2},k\right)\right)$$

$$E_y^{n-l/m}\left(i+\frac{1}{2},j,k\right)=\frac{1}{4}\left(E_y^{n-l/m}\left(i,j-\frac{1}{2},k\right)+E_y^{n-l/m}\left(i,j+\frac{1}{2},k\right)+E_y^{n-l/m}\left(i+1,j+\frac{1}{2},k\right)+E_y^{n-l/m}\left(i+1,j-\frac{1}{2},k\right)\right)$$

$$J_y^{n+\frac{l}{m}}\left(i,j+\frac{1}{2},k\right)=\left[\cos(\omega_b c_l dt)e^{-vc_l dt}\right]J_y^{n+\frac{l-1}{m}}\left(i,j+\frac{1}{2},k\right)+\left[\sin(\omega_b c_l dt)e^{-vc_l dt}\right]J_x^{n+\frac{l-1}{m}}\left(i+\frac{1}{2},j,k\right)+\varepsilon_0\omega_p^2\left\{\frac{v\left[1-\cos(\omega_b c_l dt)e^{-vc_l dt}\right]}{v^2+\omega_b^2}+\frac{\omega_b\sin(\omega_b c_l dt)e^{-vc_l dt}}{v^2+\omega_b^2}\right\}E_y^{n+\frac{l-1}{m}}\left(i,j+\frac{1}{2},k\right)-\varepsilon_0\omega_p^2\left\{\frac{v\sin(\omega_b c_l dt)e^{-vc_l dt}}{v^2+\omega_b^2}+\frac{\omega_b\left[\cos(\omega_b c_l dt)e^{-vc_l dt}-1\right]}{v^2+\omega_b^2}\right\}E_x^{n+\frac{l-1}{m}}\left(i,j+\frac{1}{2},k\right)$$

because the current density position is the same as the electric field position, therefore, when calculating $$J_y^{n+l/m}\left(i,j+\frac{1}{2},k\right),$$

it is necessary to perform interpolation on $$J_x^{n-l/m}\left(i,j+\frac{1}{2},k\right) \text{ and } E_x^{n+l/m}\left(i,j+\frac{1}{2},k\right),$$

because $J_x$ and $E_x$ are no value at a point $$\left(i,j+\frac{1}{2},k\right),$$

so it needs to be averaged by four adjacent diagonal values to obtain:

$$J_x^{n-l/m}\left(i,j+\frac{1}{2},k\right)=\frac{1}{4}\left(J_x^{n-l/m}\left(i-\frac{1}{2},j,k\right)+J_x^{n-l/m}\left(i+\frac{1}{2},j,k\right)+J_x^{n-l/m}\left(i+\frac{1}{2},j+1,k\right)+J_x^{n-l/m}\left(i-\frac{1}{2},j+1,k\right)\right)$$

$$E_x^{n+l/m}\left(i,j+\frac{1}{2},k\right)=\frac{1}{4}\left(E_x^{n-l/m}\left(i-\frac{1}{2},j,k\right)+E_x^{n-l/m}\left(i+\frac{1}{2},j,k\right)+E_x^{n-l/m}\left(i+\frac{1}{2},j+1,k\right)+E_x^{n-l/m}\left(i-\frac{1}{2},j+1,k\right)\right)$$

$$J_z^{n+\frac{l}{m}}\left(i,j,k+\frac{1}{2}\right)=e^{-vc_l dt}J_z^{n+\frac{l-1}{m}}\left(i,j,k+\frac{1}{2}\right)-\frac{e^{-vc_l dt}-1}{v}E_z^{n+\frac{l-1}{m}}\left(i,j,k+\frac{1}{2}\right)$$

wherein, i, j, k represent spatial nodes of electric field, magnetic field, and current density:

$$\gamma_{x1}=\frac{9}{8}\frac{1}{\Delta x},\ \gamma_{y1}=\frac{9}{8}\frac{1}{\Delta y},\ \gamma_{z1}=\frac{9}{8}\frac{1}{\Delta z},$$

$$\gamma_{x2}=\frac{-1}{24}\frac{1}{\Delta x},\ \gamma_{y2}=\frac{-1}{24}\frac{1}{\Delta y},\ \gamma_{z2}=\frac{-1}{24}\frac{1}{\Delta z}.$$

Optionally, the electromagnetic model includes an anisotropic magnetized plasma slab model, a blunt cone model, and a sphere model.

The various embodiments in the present disclosure are described in a progressive manner, and each embodiment focuses on the differences from other embodiments. The same and similar parts between each embodiment can be referred to each other. For the system disclosed in the embodiments, due to its correspondence with the methods disclosed in the embodiments, the description is relatively simple, please refer to the method section for relevant information.

The present disclosure has provided specific examples to explain the principles and implementation methods of the present disclosure, and the above embodiments are only used to help understand the methods and core ideas of the present disclosure. At the same time, for general skilled person in the art, there may be changes in specific implementation methods and application scope based on the ideas of the present disclosure. In summary, the content of this disclosure should not be understood as a limitation of the present disclosure.

What is claimed is:

1. A method for processing anisotropic magnetized plasma medium, comprising:

obtaining a Maxwell equation and a polarization current density equation based on electromagnetic characteristics of anisotropic magnetized plasma;

processing the Maxwell equation and the polarization current density equation to obtain an electric field intensity, a magnetic field intensity, and a polarization current density after processed;

using a matrix exponential time-domain finite difference method to obtain numerical iterative equations for the electric field intensity, the magnetic field intensity, and the polarization current density in anisotropic magnetized plasma medium based on the electric field intensity, the magnetic field intensity, and the polarization current density after processed;

applying a numerical modeling simulation electromagnetic model to determine electromagnetic characteristics of the electromagnetic model according to the numerical iterative equations for the electric field intensity, the magnetic field intensity, and the polarization current density in the anisotropic magnetized plasma medium;

wherein the Maxwell equation is:

$$\nabla \times E = -\mu_0 \frac{\partial H}{\partial t};$$

$$\nabla \times H = \varepsilon_0 \frac{\partial E}{\partial t} + J;$$

the polarization current density equation is:

$$\frac{dJ}{dt} + vJ = \varepsilon_0 \omega_p^2 E + {}_b \times;$$

where, E is the electric field intensity, H is the magnetic field intensity, J is the polarization current density, $\varepsilon_0$, $\mu_0$ are respectively a dielectric constant and a permeability in vacuum, $\omega_p$ is a plasma frequency, v is a plasma collision frequency, $\omega_b = B_0/m_e$ is a electron cyclotron frequency, $B_0$ is an external static magnetic field, e is an electron charge, and $m_e$ is an electron mass;

wherein processing the Maxwell equation and the polarization current density equation to obtain the electric field intensity, the magnetic field intensity, and the polarization current density after processed, specifically comprising:

performing multi-level symplectic discretization on the Maxwell equation and the polarization current density equation to obtain the electric field intensity, the magnetic field intensity, and the polarization current density in a symplectic discretization format:

$$E^{n+l/m} = E^{n+(l-1)/m} + \frac{d_l \Delta t}{\varepsilon_0} \nabla \times H^{n+l/m} + \frac{-d_l \Delta t}{\varepsilon_0} J^{n+l/m}$$

$$H^{n+l/m} = H^{n+(l-1)/m} + \frac{-c_l \Delta t}{\mu_0} \nabla \times E^{n+(l-1)/m}$$

$$J^{n+l/m} = DJ^{n+(l-1)/m} + \varepsilon_0 \omega_p^2 F E^{n+(l-1)/m},$$

where, $d_l$ and $c_l$ are coefficients of symplectic propagator, $$\Omega = \begin{bmatrix} -v & -\omega_{bz} & \omega_{by} \\ \omega_{bz} & -v & -\omega_{bx} \\ -\omega_{by} & \omega_{bx} & -v \end{bmatrix},$$

l is a order of a field component $\Psi = (H, E, J)^T$, and m is a number of stages of non-dissipative p-order symplectic integral, $D = e^{C\Delta t}$, $F = \Omega^{-1}(D - I)$;

wherein using a matrix exponential time-domain finite difference method to obtain numerical iterative equations for the electric field intensity, the magnetic field intensity, and the polarization current density in anisotropic magnetized plasma medium based on the electric field intensity, the magnetic field intensity, and the polarization current density after processed specifically comprises:

assuming that the plasma medium is biased by a static magnetic field in the z-direction, based on the electric field intensity, the magnetic field intensity, and the polarization current density after processed, the matrix exponential time-domain finite difference method is used to obtain numerical iterative equations for the electric field intensity, the magnetic field intensity, and the polarization current density in anisotropic magnetized plasma medium:

$$E_x^{n+l/m}\left(i+\frac{1}{2}, j, k\right) = E_x^{n+(l-1)/m}\left(i+\frac{1}{2}, j, k\right) + \frac{d_l \Delta t}{\varepsilon_0} \times$$
$$\left\{\gamma_{y1}\left[H_z^{n+l/m}\left(i+\frac{1}{2}, j+\frac{1}{2}, k\right) - H_z^{n+l/m}\left(i+\frac{1}{2}, j-\frac{1}{2}, k\right)\right] +\right.$$
$$\gamma_{z1}\left[-H_y^{n+l/m}\left(i+\frac{1}{2}, j, k+\frac{1}{2}\right) + H_y^{n+l/m}\left(i+\frac{1}{2}, j, k-\frac{1}{2}\right)\right] +$$
$$\gamma_{y2}\left[H_z^{n+l/m}\left(i+\frac{1}{2}, j+\frac{3}{2}, k\right) - H_z^{n+l/m}\left(i+\frac{1}{2}, j-\frac{3}{2}, k\right)\right] +$$
$$\left.\gamma_{z2}\left[-H_y^{n+l/m}\left(i+\frac{1}{2}, j, k+\frac{3}{2}\right) + H_y^{n+l/m}\left(i+\frac{1}{2}, j, k-\frac{3}{2}\right)\right]\right\} -$$
$$\frac{d_l \Delta t}{\varepsilon_0} J_x^{n+(l-1)/m}\left(i+\frac{1}{2}, j, k\right)$$

$$E_x^{n+l/m}\left(i, j+\frac{1}{2}, k\right) = E_x^{n+(l-1)/m}\left(i, j+\frac{1}{2}, k\right) + \frac{d_l \Delta t}{\varepsilon_0} \times$$
$$\left\{\gamma_{z1}\left[H_x^{n+l/m}\left(i, j+\frac{1}{2}, k+\frac{1}{2}\right) - H_x^{n-l/m}\left(i, j+\frac{1}{2}, k-\frac{1}{2}\right)\right] +\right.$$
$$\gamma_{x1}\left[-H_z^{n+l/m}\left(i+\frac{1}{2}, j+\frac{1}{2}, k\right) + H_z^{n+l/m}\left(i-\frac{1}{2}, j+\frac{1}{2}, k\right)\right] +$$
$$\gamma_{z2}\left[H_x^{n+l/m}\left(i, j+\frac{1}{2}, k+\frac{3}{2}\right) - H_x^{n+l/m}\left(i, j+\frac{1}{2}, k-\frac{3}{2}\right)\right] +$$
$$\left.\gamma_{x2}\left[-H_z^{n+l/m}\left(i+\frac{3}{2}, j+\frac{1}{2}, k\right) + H_z^{n+l/m}\left(i-\frac{3}{2}, j+\frac{1}{2}, k\right)\right]\right\} -$$
$$\frac{d_l \Delta t}{\varepsilon_0} J_x^{n+(l-1)/m}\left(i, j+\frac{1}{2}, k\right)$$

$$E_x^{n+l/m}\left(i, j, k+\frac{1}{2}\right) = E_x^{n+(l-1)/m}\left(i, j, k+\frac{1}{2}\right) + \frac{d_l \Delta t}{\varepsilon_0} \times$$
$$\left\{\gamma_{x1}\left[H_y^{n+l/m}\left(i+\frac{1}{2}, j, k+\frac{1}{2}\right) - H_y^{n+l/m}\left(i-\frac{1}{2}, j, k+\frac{1}{2}\right)\right] +\right.$$
$$\gamma_{y1}\left[-H_x^{n+l/m}\left(i, j+\frac{1}{2}, k+\frac{1}{2}\right) + H_x^{n+l/m}\left(i, j-\frac{1}{2}, k+\frac{1}{2}\right)\right] +$$
$$\gamma_{x2}\left[H_y^{n+l/m}\left(i+\frac{3}{2}, j, k+\frac{1}{2}\right) - H_y^{n+l/m}\left(i-\frac{3}{2}, j, k+\frac{1}{2}\right)\right] +$$
$$\left.\gamma_{y2}\left[-H_x^{n+l/m}\left(i, j+\frac{3}{2}, k+\frac{1}{2}\right) + H_x^{n+l/m}\left(i, j-\frac{3}{2}, k+\frac{1}{2}\right)\right]\right\} -$$
$$\frac{d_l \Delta t}{\varepsilon_0} J_x^{n+(l-1)/m}\left(i, j, k+\frac{1}{2}\right)$$

$$H_x^{n+l/m}\left(i, j+\frac{1}{2}, k+\frac{1}{2}\right) = H_x^{n+(l-1)/m}\left(i, j+\frac{1}{2}, k+\frac{1}{2}\right) + \frac{c_l \Delta t}{\mu_0} \times$$
$$\left\{\gamma_{z1}\left[E_y^{n+(l-1)/m}\left(i, j+\frac{1}{2}, k+1\right) - E_y^{n+(l-1)/m}\left(i, j+\frac{1}{2}, k\right)\right] +\right.$$
$$\gamma_{y1}\left[-E_z^{n-(l-1)/m}\left(i, j+1, k+\frac{1}{2}\right) + E_z^{n+(l-1)/m}\left(i, j, k+\frac{1}{2}\right)\right] +$$
$$\gamma_{z2}\left[E_y^{n+(l-1)/m}\left(i, j+\frac{1}{2}, k+2\right) - E_y^{n+(l-1)/m}\left(i, j+\frac{1}{2}, k-1\right)\right] +$$
$$\left.\gamma_{y2}\left[-E_z^{n-(l-1)/m}\left(i, j+2, k+\frac{1}{2}\right) + E_z^{n+(l-1)/m}\left(i, j-1, k+\frac{1}{2}\right)\right]\right\}$$

$$H_x^{n-l/m}\left(i+\frac{1}{2}, j, k+\frac{1}{2}\right) = H_x^{n-(l-1)/m}\left(i+\frac{1}{2}, j, k+\frac{1}{2}\right) + \frac{c_l \Delta t}{\mu_0} \times$$
$$\left\{\gamma_{x1}\left[E_z^{n+(l-1)/m}\left(i+1, j+\frac{1}{2}, k\right) - E_y^{n+(l-1)/m}\left(i, j, k+\frac{1}{2}\right)\right] +\right.$$
$$\gamma_{z1}\left[-E_x^{n+(l-1)/m}\left(i+\frac{1}{2}, j, k+1\right) + E_z^{n+(l-1)/m}\left(i+\frac{1}{2}, j, k\right)\right] +$$

-continued $$\gamma_{x2}\left[E_z^{n+(l-1)/m}\left(i+2, j, k+\frac{1}{2}\right)-E_y^{n+(l-1)/m}\left(i-1, j, k+\frac{1}{2}\right)\right]+$$

$$\gamma_{z2}\left[-E_x^{n+(l-1)/m}\left(i+\frac{1}{2}, j, k+2\right)+E_z^{n+(l-1)/m}\left(i+\frac{1}{2}, j, k-1\right)\right]\Bigg\}$$

$$H_x^{n-l/m}\left(i+\frac{1}{2}, j+\frac{1}{2}, k\right)=H_x^{n-(l-1)/m}\left(i+\frac{1}{2}, j+\frac{1}{2}, k\right)+\frac{c_l\Delta t}{\mu_0}\times$$

$$\Bigg\{\gamma_{y1}\left[E_x^{n+(l-1)/m}\left(i+\frac{1}{2}, j+1, k\right)-E_x^{n+(l-1)/m}\left(i+\frac{1}{2}, j, k\right)\right]+$$

$$\gamma_{x1}\left[-E_y^{n+(l-1)/m}\left(i+1, j+\frac{1}{2}, k\right)+E_y^{n+(l-1)/m}\left(i, j+\frac{1}{2}, k\right)\right]+$$

$$\gamma_{y2}\left[E_x^{n+(l-1)/m}\left(i+\frac{1}{2}, j+2, k\right)-E_x^{n+(l-1)/m}\left(i+\frac{1}{2}, j-1, k\right)\right]+$$

$$\gamma_{x2}\left[-E_y^{n+(l-1)/m}\left(i+2, j+\frac{1}{2}, k\right)+E_y^{n+(l-1)/m}\left(i-1, j+\frac{1}{2}, k\right)\right]\Bigg\}$$

$$J_x^{n+\frac{l}{m}}\left(i+\frac{1}{2}, j, k\right)= \left[\cos(\omega_b c_l dt)e^{-\nu c_l dt}\right]J_x^{n+\frac{l-1}{m}}\left(i+\frac{1}{2}, j, k\right)+ \left[\sin(\omega_b c_l dt)e^{-\nu c_l dt}\right]J_y^{n+\frac{l-1}{m}}\left(i+\frac{1}{2}, j, k\right)+ \varepsilon_0\omega_p^2\left\{\frac{\nu\left[1-\cos(\omega_b c_l dt)e^{-\nu c_l dt}\right]}{\nu^2+\omega_b^2}+\frac{\omega_b\sin(\omega_b c_l dt)e^{-\nu c_l dt}}{\nu^2+\omega_b^2}\right\} E_x^{n+\frac{l-1}{m}}\left(i+\frac{1}{2}, j, k\right)+ \varepsilon_0\omega_p^2\left\{\frac{\nu\,\sin(\omega_b c_l dt)e^{-\nu c_l dt}}{\nu^2+\omega_b^2}+\frac{\omega_b\left[\cos(\omega_b c_l dt)e^{-\nu c_l dt}-1\right]}{\nu^2+\omega_b^2}\right\} E_y^{n+\frac{l-1}{m}}\left(i+\frac{1}{2}, j, k\right)$$

because a current density position is the same as an electric field position, therefore, when calculating $$J_x^{n+l/m}\left(i+\frac{1}{2}, j, k\right),$$

it is necessary to perform interpolation on $$J_y^{n-l/m}\left(i+\frac{1}{2}, j, k\right) \text{ and } E_y^{n-l/m}\left(i+\frac{1}{2}, j, k\right),$$

because $J_y$ and $E_y$ are no value at a point $$\left(i+\frac{1}{2}, j, k\right),$$

so it needs to be averaged by four adjacent diagonal values to obtain:

$$J_y^{n-l/m}\left(i+\frac{1}{2}, j, k\right)=\frac{1}{4}\left(J_y^{n-l/m}\left(i, j-\frac{1}{2}, k\right)+ J_y^{n-l/m}\left(i, j+\frac{1}{2}, k\right)+J_y^{n-l/m}\left(i+1, j+\frac{1}{2}, k\right)+J_y^{n-l/m}\left(i+1, j-\frac{1}{2}, k\right)\right)$$

$$E_y^{n-l/m}\left(i+\frac{1}{2}, j, k\right)=\frac{1}{4}\left(E_y^{n-l/m}\left(i, j-\frac{1}{2}, k\right)+ E_y^{n-l/m}\left(i, j+\frac{1}{2}, k\right)+E_y^{n-l/m}\left(i+1, j+\frac{1}{2}, k\right)+E_y^{n-l/m}\left(i+1, j-\frac{1}{2}, k\right)\right)$$

-continued $$J_x^{n+\frac{l}{m}}\left(i, j+\frac{1}{2}, k\right)=\left[\cos(\omega_b c_l dt)e^{-\nu c_l dt}\right] J_y^{n+\frac{l-1}{m}}\left(i, j+\frac{1}{2}, k\right)+\left[\sin(\omega_b c_l dt)e^{-\nu c_l dt}\right]J_x^{n+\frac{l-1}{m}}\left(i+\frac{1}{2}, j, k\right)+\varepsilon_0\omega_p^2 \left\{\frac{\nu\left[1-\cos(\omega_b c_l dt)e^{-\nu c_l dt}\right]}{\nu^2+\omega_b^2}+\frac{\omega_b\sin(\omega_b c_l dt)e^{-\nu c_l dt}}{\nu^2+\omega_b^2}\right\}E_y^{n+\frac{l-1}{m}}\left(i, j+\frac{1}{2}, k\right)-\varepsilon_0 \omega_p^2\left\{\frac{\nu\,\sin(\omega_b c_l dt)e^{-\nu c_l dt}}{\nu^2+\omega_b^2}+\frac{\omega_b\left[\cos(\omega_b c_l dt)e^{-\nu c_l dt}-1\right]}{\nu^2+\omega_b^2}\right\}E_x^{n+\frac{l-1}{m}}\left(i, j+\frac{1}{2}, k\right)$$

because the current density position is the same as the electric field position, therefore, when calculating $$J_y^{n+l/m}\left(i, j+\frac{1}{2}, k\right),$$

it is necessary to perform interpolation on $$J_x^{n-l/m}\left(i, j+\frac{1}{2}, k\right) \text{ and } E_x^{n+l/m}\left(i, j+\frac{1}{2}, k\right),$$

because $J_x$ and $E_x$ are no value at a point $$\left(i, j+\frac{1}{2}, k\right),$$

so it needs to be averaged by four adjacent diagonal values to obtain:

$$J_x^{n-l/m}\left(i, j+\frac{1}{2}, k\right)=\frac{1}{4}\left(J_x^{n-l/m}\left(i-\frac{1}{2}, j, k\right)+ J_x^{n-l/m}\left(i+\frac{1}{2}, j, k\right)+J_x^{n-l/m}\left(i+\frac{1}{2}, j+1, k\right)+J_x^{n-l/m}\left(i-\frac{1}{2}, j+1, k\right)\right)$$

$$E_x^{n+l/m}\left(i, j+\frac{1}{2}, k\right)=\frac{1}{4}\left(E_x^{n-l/m}\left(i-\frac{1}{2}, j, k\right)+ E_x^{n-l/m}\left(i+\frac{1}{2}, j, k\right)+E_x^{n-l/m}\left(i+\frac{1}{2}, j+1, k\right)+E_x^{n-l/m}\left(i-\frac{1}{2}, j+1, k\right)\right)$$

$$J_z^{n+\frac{l}{m}}\left(i, j, k+\frac{1}{2}\right)= e^{-\nu c_l dt}J_z^{n+\frac{l-1}{m}}\left(i, j, k+\frac{1}{2}\right)-\frac{e^{-\nu c_l dt}-1}{\nu}E_z^{n+\frac{l-1}{m}}\left(i, j, k+\frac{1}{2}\right)$$

where, i, j, k represent spatial nodes of electric field, magnetic field, and current density:

$$\gamma_{x1}=\frac{9}{8}\frac{1}{\Delta x},\ \gamma_{y1}=\frac{9}{8}\frac{1}{\Delta y},\ \gamma_{z1}=\frac{9}{8}\frac{1}{\Delta z},$$

$$\gamma_{x2}=\frac{-1}{24}\frac{1}{\Delta x},\ \gamma_{y2}=\frac{-1}{24}\frac{1}{\Delta y},\ \gamma_{z2}=\frac{-1}{24}\frac{1}{\Delta z}.$$

wherein the electromagnetic model comprises an anisotropic magnetized plasma slab model, a blunt cone model, and a sphere model.

* * * * *